US012190688B2

(12) United States Patent
DiGangi et al.

(10) Patent No.: US 12,190,688 B2
(45) **Date of Patent: *Jan. 7, 2025**

(54) SYSTEMS AND METHODS FOR RETROFIT HOUSING FOR TRANSACTION DEVICES

(71) Applicant: Wells Fargo Bank, N.A., San Francisco, CA (US)

(72) Inventors: Frank DiGangi, San Francisco, CA (US); Christian Mande, Charlotte, NC (US); Dennis E. Montenegro, Concord, CA (US); Darren M. Goetz, Salinas, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,194

(22) Filed: Jul. 10, 2023

(65) Prior Publication Data

US 2023/0351864 A1 Nov. 2, 2023

Related U.S. Application Data

(63) Continuation of application No. 17/496,937, filed on Oct. 8, 2021, now Pat. No. 11,699,331.

(51) Int. Cl.
*G07F 19/00* (2006.01)

(52) U.S. Cl.
CPC .......... *G07F 19/202* (2013.01); *G07F 19/203* (2013.01)

(58) Field of Classification Search
CPC ............................ G07F 19/202; G07F 19/203
USPC .................................................. 235/7 R, 379
See application file for complete search history.

(56) References Cited

U.S. PATENT DOCUMENTS

| | | | |
|---|---|---|---|
| 4,662,621 A | 5/1987 | Lundblad | |
| 6,502,746 B1 | 1/2003 | Do et al. | |
| 6,712,219 B2 | 3/2004 | Kobayashi et al. | |
| 7,431,205 B2 | 10/2008 | Nomiyama et al. | |
| 8,052,044 B2 | 11/2011 | Washington et al. | |
| 9,460,469 B1 | 10/2016 | Donaho et al. | |
| 10,109,134 B2 | 10/2018 | Jeong et al. | |
| 10,339,744 B2 | 7/2019 | Lee | |
| 10,565,832 B2 | 2/2020 | Vankirk et al. | |
| 10,692,320 B2 | 6/2020 | Yuasa et al. | |
| 11,328,563 B1 | 5/2022 | Fraser et al. | |
| 11,699,331 B1 * | 7/2023 | DiGangi | G07F 19/202 235/7 R |
| 11,830,327 B1 | 11/2023 | Digangi et al. | |
| 2010/0242810 A1 | 9/2010 | Todd | |
| 2011/0036681 A1 | 2/2011 | Dunlop et al. | |

(Continued)

*Primary Examiner* — Daniel A Hess
(74) *Attorney, Agent, or Firm* — Foley & Lardner LLP

(57) ABSTRACT

A housing that facilitates a service operation for a transaction device includes a transfer cassette interface structured to receive a transfer cassette where the transfer cassette is structured to retrievably store banknotes, a media aperture interface structured to removably couple to a media aperture of the transaction device where the media aperture interface is coupled to a transfer arm structured to facilitate transferring banknotes to and from the media aperture and the media aperture interface, and a housing transport apparatus structured to facilitate transporting banknotes to and from the transfer cassette via at least one of the transfer cassette interface or the media aperture interface.

20 Claims, 17 Drawing Sheets

(56) References Cited

U.S. PATENT DOCUMENTS

| | | | |
|---|---|---|---|
| 2015/0243119 | A1 | 8/2015 | Hayashi et al. |
| 2018/0040187 | A1 | 2/2018 | Jeong et al. |
| 2018/0286164 | A1 | 10/2018 | Lee |
| 2021/0125449 | A1 | 4/2021 | Fukuda et al. |
| 2022/0343738 | A1 | 10/2022 | Fraser et al. |

* cited by examiner

SYSTEMS AND METHODS FOR RETROFIT HOUSING FOR TRANSACTION DEVICES

CROSS-REFERENCE TO RELATED APPLICATION

This application is a continuation of U.S. application Ser. No. 17/496,937, filed Oct. 8, 2021, which is incorporated herein by reference in its entirety and for all purposes.

TECHNICAL FIELD

The present disclosure relates to apparatuses, systems, and methods for enabling retrofit housing for transaction devices, such as automated teller machines (ATMs).

BACKGROUND

ATMs are a convenient way for customers to complete financial transactions, including document deposits, banknote deposits and the like. ATMs may be placed and accessed by customers at various geographic locations, such as bank locations, convenience stores, or other stores, to facilitate an account holder's interaction with the banking systems. During normal operation, ATMs may dispense banknotes during withdrawal transactions or receive banknotes during deposit transactions. An ATM that processes a high volume of withdrawal transactions may become depleted of banknotes. An ATM's banknote storage may become full if the ATM processes a high volume of deposit transactions. In either case, a bank employee may be required to add or remove banknotes from the ATM banknote storage.

SUMMARY

At least one arrangement relates to a housing that facilitates a service operation for a transaction device. The housing is communicatively coupled to a housing control computing system. The housing includes a user interface, a transfer cassette interface, a media aperture interface, and a housing transport apparatus. The user interface includes a first input/output (I/O) device. The first I/O device is communicatively coupled to the housing control computing system. The transfer cassette interface is structured to receive a transfer cassette. The transfer cassette is structured to retrievably store banknotes. The media aperture interface structured to couple to a media aperture of the transaction device. The media aperture interface is coupled to a first sensor and a transfer arm. The first sensor is structured to detect one or more parameters associated with the service operation. The transfer arm is structured to facilitate transferring banknotes to and from the media aperture and the media aperture interface. The housing transport apparatus structured to facilitate transporting banknotes to and from the transfer cassette via at least one of the transfer cassette interface and the media aperture interface.

Another arrangement relates to a method of facilitating a service operation for a transaction device. The method includes receiving, by a housing, a transfer cassette structured to retrievably store banknotes. The housing is communicatively coupled to a housing control computing system. The method also includes coupling the housing to the transaction device proximate a media aperture of the transaction device. The method also includes causing a transport arm of the housing to transfer the banknotes to and from the media aperture and a media aperture interface of the housing. The method also includes causing a housing transport apparatus to transport banknotes to and from the transfer cassette via at least one of a transfer cassette interface and the media aperture interface.

Another arrangement relates to a non-transitory computer readable medium having computer-executable instructions embodied therein that, when executed by at least one processor of a computing system, cause the computing system to perform operations to facilitate servicing a transaction device. The operations includes receiving, from a sensor, a first indication that a housing is coupled to the transaction device proximate a media aperture of the transaction device. The operations also include receiving, via the transaction device, a first user input. The operations also include causing a housing transport apparatus to begin transferring a first set of banknotes to and from a transfer cassette and a media aperture interface. The media aperture interface is positioned proximate the media aperture. The operations also include causing a transport arm to begin transferring the first set of banknotes to and from the media aperture and the media aperture interface. The operations also include determining that the first set of banknotes has been transferred. The operations also include providing a second indication to the transaction device that the first set of banknotes has been transferred.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
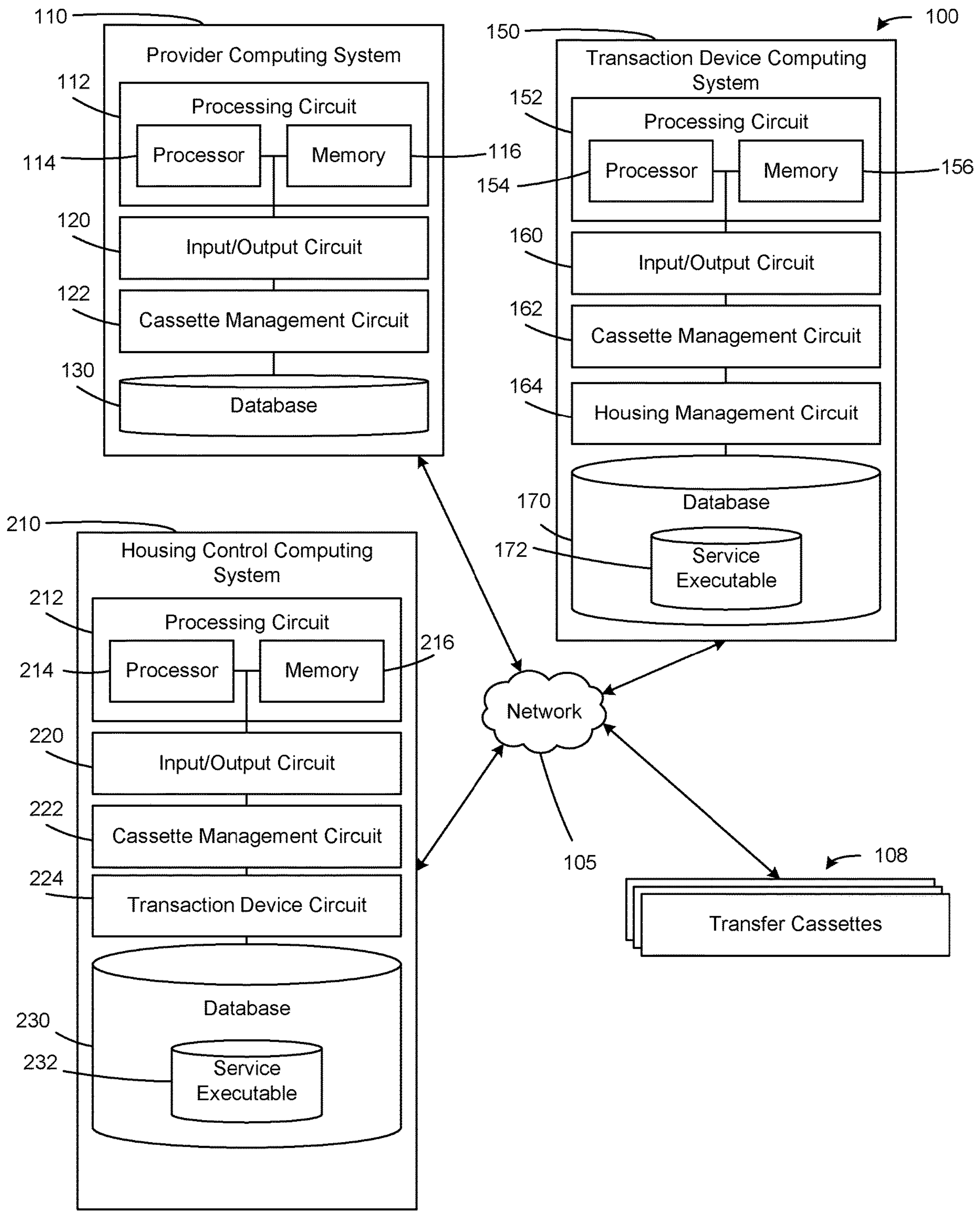
FIG. 1 is a block diagram of a transaction computing system, according to an example arrangement.

Referring generally to the figures, disclosed are systems, methods and non-transitory computer-readable media for a housing device that facilitates a service operation for a transaction device such as an ATM. In an example illustrative scenario, a transaction device (e.g., an ATM, a cash recycler, a POS device, and so on) may provide an indication of a need for service by a user (e.g., a provider employee), including removing excess banknotes or refilling depleted banknotes. For example, the transaction device may detect by one or more sensors that the transaction device requires additional banknotes. The transaction device may alert a computing system, such as a remote computing system, a cloud computing system, a service provider computing system, or other computing system. The computing system may alert the user that the transaction device requires service. The computing system may also select one or more transfer cassettes to facilitate the service. For example, the computing system may select empty or nearly empty transfer cassettes to receive banknotes form the transaction device if the transaction device has too many banknotes. The computing system may select a full or nearly full transfer cassette to provide banknotes to the transaction device if the transaction device does not have a sufficient number of banknotes. The computing system may also select a transfer cassette based on banknote denomination (e.g., one dollar bills, ten dollar bills, and so on). In some example scenarios, the computing system may be connected to multiple transaction devices. Accordingly, the computing system may also provide a notification to the user indicating which transaction device require service.

In an example operating scenario, a transaction device may detect (e.g., via one or more sensors) a fill level of one or more storage cassettes stored by the transaction device. The fill level may indicate a total number of banknotes stored in all the storage cassettes, a number of banknotes stored by at least one storage cassette, a value of banknotes stored, a quantity of each denomination of banknote stored, and/or other storage parameters. The transaction device may alert a user (e.g., via a provider computing system) that the transaction device is in need of a service operation based on the fill level of the storage cassettes. The service operation may include providing additional banknotes to the transaction device and/or removing banknotes form the transaction device.

In some arrangements, the provider computing system may select one or more transfer cassettes to perform the service operation based, for example, on the type of service operation. The provider computing system may provide a notification to the user indicating which transfer cassettes to use in the service operation. In some arrangements, the provider computing system may provide instructions regarding a particular adapter housing to facilitate the service operation. For example, the provider computing system is structured to identify a particular adapter housing of a plurality of adapter housing. The provider computing system provides instructions to a user to use the particular adapter housing to facilitate the service operation. In some arrangements, the particular adapter housing is selected based on a cassette associated with the particular adapter housing and/or any other information associated with the particular adapter housing.

In some arrangements, the user may couple the adapter housing to the transaction device on a user facing side of the transaction device. The adapter housing may couple to a media aperture of the transaction device such that banknotes can be transferred to/from the transaction device via the media aperture. The user may couple (i.e. dock) the transfer cassette to the adapter housing before or after coupling the adapter housing to the transaction device.

When the adapter housing is coupled to the transaction device, the transaction device may enter a service mode. In some arrangements, the user inputs a security token (e.g., a password, a security card, a biometric, and the like), to initiate the service mode. When the transaction device is in the service mode, the adapter housing may facilitate transferring bills to/from the transaction device. In a filling operation, the adapter housing may facilitate transferring bills form the docked transfer cassette to the transaction device. In a removal operation, the adapter housing may facilitate transferring bills from the transaction device to the docked transfer cassette. In some arrangements, the service operation may include any combination of filling operations and removal operations and/or may include multiple of each operation type. In these arrangements, the service operation may be partially completed when a transfer cassette is docked. Transfer cassettes may be sequentially and/or serially docked with the adapter housing until the service operation is fully completed.

During the service operation, the transaction device may display and update a service mode user interface. The interface may be updated based on service operation parameters, such as a transfer cassette serial number, a transfer cassette capacity, a value of banknotes stored by the transfer cassette, a service operation type, a service operation date, a service operation identification number, an indication of whether the service operation is completed, an indication of whether a new transfer cassette should be installed, and/or other parameters of the service operation. In some arrangements, the service mode UI is structured to receive a user input. The user input may include an indication to start the service operation, restart the service operation (e.g., after a new transfer cassette has been installed), stop the service operation, decouple/remove the adapter housing, exit the service mode, etc.

In some arrangements, the transaction device is retrofit with an adapter housing. The provider computing system may identify one or more transfer cassettes to perform the service operation based, for example, on the type of service operation. The provider computing system may provide a notification to the user indicating which transfer cassettes to use in the service operation.

In some arrangements, the user may couple the one or more transfer cassettes to the retrofit adapter housing. The retrofit adapter housing may couple to a transport apparatus of the transaction device such that banknotes can be transferred to/from the transaction device via the transport apparatus.

When the one or more transfer cassettes are coupled to the retrofit adapter housing, the transaction device may enter a service mode. In some arrangements, the user inputs a security token (e.g., a password, a security card, a biometric, and the like), to initiate the service mode. When the transaction device is in the service mode, the retrofit adapter housing may facilitate transferring bills to/from the transaction device. In a filling operation, the adapter housing may facilitate transferring bills form the docked transfer cassette to the transaction device. In a removal operation, the adapter housing may facilitate transferring bills from the transaction device to the docked transfer cassette. In some arrangements, the service operation may include any combination of filling operations and removal operations and/or may include multiple of each operation type. In these arrangements, the service operation may be partially completed when a transfer cassette is docked. Transfer cassettes may be sequentially and/or serially docked with the retrofit adapter housing until the service operation is fully completed.

During the service operation, the retrofit adapter housing may display and update a service mode user interface. The interface may be updated based on service operation parameters, such as a transfer cassette serial number, a transfer cassette capacity, a value of banknotes stored by the transfer cassette, a service operation type, a service operation date, a service operation identification number, an indication of whether the service operation is completed, an indication of whether a new transfer cassette should be installed, and/or other parameters of the service operation. In some arrangements, the service mode UI is structured to receive a user input. The user input may include an indication to start the service operation, restart the service operation (e.g., after a new transfer cassette has been installed), stop the service operation, decouple/remove the transfer cassette(s), exit the service mode, etc.

In some arrangements, an adapter housing is provided in one or more cassette ports of the transaction device. The provider computing system may identify one or more transfer cassettes to perform the service operation based, for example, on the type of service operation. The provider computing system may provide a notification to the user indicating which transfer cassettes to use in the service operation.

In some arrangements, the user may couple the one or more transfer cassettes to the adapter housing. The adapter housing may couple to a transport apparatus of the transaction device, via a cassette port, such that banknotes can be transferred to/from the transaction device via the transport apparatus.

When the one or more transfer cassettes are coupled to the adapter housing, the transaction device may enter a service mode. In some arrangements, the user inputs a security token (e.g., a password, a security card, a biometric, and the like), to initiate the service mode. When the transaction device is in the service mode, the adapter housing may facilitate transferring bills to/from the transaction device. In a filling operation, the adapter housing may facilitate transferring bills form the docked transfer cassette to the transaction device. In a removal operation, the adapter housing may facilitate transferring bills from the transaction device to the docked transfer cassette. In some arrangements, the service operation may include any combination of filling operations and removal operations and/or may include multiple of each operation type. In these arrangements, the service operation may be partially completed when a transfer cassette is docked. Transfer cassettes may be sequentially and/or serially docked with the retrofit adapter housing until the service operation is fully completed.

During the service operation, the retrofit adapter housing may display and update a service mode user interface. The interface may be updated based on service operation parameters, such as a transfer cassette serial number, a transfer cassette capacity, a value of banknotes stored by the transfer cassette, a service operation type, a service operation date, a service operation identification number, an indication of whether the service operation is completed, an indication of whether a new transfer cassette should be installed, and/or other parameters of the service operation. In some arrangements, the service mode UI is structured to receive a user input. The user input may include an indication to start the service operation, restart the service operation (e.g., after a new transfer cassette has been installed), stop the service operation, decouple/remove the transfer cassette(s), exit the service mode, etc.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a block diagram of a transaction computing system 100, according to an example arrangement. In some arrangements, the system 100 is associated with a service provider such as a business, a financial institution, and the like, which provides transaction devices for customers to perform transactions (e.g., deposits, withdrawals, purchases, or other transactions). In some arrangements, and as shown in FIG. 1, the system 100 includes a provider computing system 110, a transaction device computing system 150, a housing control computing system 210, and one or more transfer cassettes 108. Each of the computing systems of the system 100 are in communication with each other and are connected by a network 105. Specifically, the provider computing system 110, the transaction device computing system 150, the housing control computing system 210, and the transfer cassettes 108 are communicatively coupled to the network 105 such that the network 105 permits the direct or indirect exchange of data, values, instructions, messages, and the like (represented by the double-headed arrows in FIG. 1). In some arrangements, the network 105 is configured to communicatively couple to additional computing system(s). For example, the network 105 may facilitate communication of data between the provider computing system 110 and other computing systems associated with the service provider or with a customer of the service provider such as a user device (e.g., a mobile device, smartphone, desktop computer, laptop computer, tablet, or any other computing system). The network 105 may include one or more of a cellular network, the Internet, Wi-Fi, Wi-Max, a proprietary provider network, a proprietary retail or service provider network, and/or any other kind of wireless or wired network.

In some arrangements, the provider computing system 110 may be a local computing system at a business location (e.g., a branch of a financial institution, a retail store location, or any other physical location). In some arrangements, the provider computing system 110 may be a remote computing system such as a remote server, a cloud computing system, and the like. In some arrangements, the provider computing system may be part of a larger computing system such as a multi-purpose server or other multi-purpose computing system. In some arrangements, the provider computing system 110 may be implemented on a third-party computing device operated by a third-party service provider (e.g., AWS, Azure, GCP, and/or other third party computing services).

As shown in FIG. 1, the provider computing system 110 includes a processing circuit 112, input/output (I/O) circuit 120, one or more specialized processing circuits shown as a cassette management circuit 122 and a database 130. The processing circuit 112 may be coupled to the input/output circuit 120, the specialized processing circuits, and/or the database 130. The processing circuit 112 may include a processor 114 and a memory 116. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicatively coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the computing system 110 is configured to run a variety of application programs and store associated data in a database of the memory 116 (e.g., database 130).

The input/output circuit 120 is structured to receive communications from and provide communications to other computing devices, users, and the like associated with the provider computing system 110. The input/output circuit 120 is structured to exchange data, communications, instructions, and the like with an input/output device of the components of the system 100. In some arrangements, the input/output circuit 120 includes communication circuitry for facilitating the exchange of data, values, messages, and the like between the input/output device 120 and the components of the provider computing system 110. In some arrangements, the input/output device 120 includes machine-readable media for facilitating the exchange of information between the input/output circuit 120 and the components of the provider computing system 110. In some arrangements, the input/output circuit 120 includes any combination of hardware components, communication circuitry, and machine-readable media.

In some arrangements, the I/O circuit 120 may include a network interface. The network interface may be used to establish connections with other computing devices by way of the network 105. The network interface may include program logic that facilitates connection of the provider computing system 110 to the network 105. In some arrangements, the network interface may include any combination of a wireless network transceiver (e.g., a cellular modem, a Bluetooth transceiver, a Wi-Fi transceiver) and/or a wired network transceiver (e.g., an Ethernet transceiver). For example, the I/O circuit 120 may include an Ethernet device such as an Ethernet card and machine-readable media such as an Ethernet driver configured to facilitate connections with the network 105. In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted.

In some arrangements, the I/O circuit 120 includes suitable input/output ports and/or uses an interconnect bus (e.g., bus 502 in FIG. 9) for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the input/output circuit 120 may provide an interface for the user to interact with various applications and/or executables stored on the provider computing system 110. For example, the input/output circuit 120 may include a keyboard, a keypad, a mouse, joystick, a touch screen, a microphone, a biometric device, a virtual reality headset, smart glasses, and the like. As another example, input/output circuit 120, may include, but is not limited to, a television monitor, a computer monitor, a printer, a facsimile, a speaker, and so on.

The memory 116 may store a database 130, according to some arrangements. The database may retrievably store data associated with the provider computing system 110 and/or any other component of the system 100. That is, the data may include information associated with each of the components of the system 100. For example, the data may include information about the transaction device computing system 150 and, if the system 100 includes more than one transaction device, information about each respective transaction device computing system 150. The data may also include information associated with the housing control computing system 210 and/or transfer cassettes 108. The data may be retrievable, viewable, and/or editable by the provider computing system 110 (e.g., by user input via the I/O circuit 120). The database 130 may be configured to store one or more applications and/or executables to facilitate transactions, track one or more cassettes, or any other operation described herein. In some arrangements, the applications and/or executables may be incorporated with an existing application in use by the provider computing system 110. In some arrangements, the applications and/or executables are separate software applications implemented on the provider computing system 110. The applications and/or executables may be downloaded by the provider computing system 110 prior to its usage, hard coded into the memory 116 of the processing circuit 112, or be a network-based or web-based interface application such that the provider computing system 110 may provide a web browser to access the application, which may be executed remotely from the provider computing system 110 (e.g., by a user device). Accordingly, the provider computing system 110 may include software and/or hardware capable of implementing a network-based or web-based application. For example, in some instances, the applications and/or executables include software such as HTML, XML, WML, SGML, PHP (Hypertext Preprocessor), CGI, and like languages.

In the latter instance, a user (e.g., a provider employee) may log onto or access the web-based interface before usage of the applications and/or executables. In this regard, the applications and/or executables may be supported by a separate computing system including one or more servers, processors, network interface, and so on, that transmit applications for use to the provider computing system 110.

In some arrangements, the provider computing system 110 includes hardware, software, or any combination of hardware and software structured to facilitate operations of the components of the system 100. For example, and as shown in FIG. 1, the provider computing system includes a cassette management circuit 122 that includes any combination of hardware and software for managing the transfer cassettes 108. In some embodiments, the provider computing system 110 may include any combination of hardware and software including specialized processing circuits, applications, executables, and the like for controlling, managing, or facilitating the operation of the other computing systems of the system 100 including the transaction device computing system 150 and the housing control computing system 210. For example, the provider computing system 110 may include a transaction device circuit and associated software and/or a housing control circuit and associated software. The additional specialized circuits may be substantially similar to the cassette management circuit 122 described herein below.

In some arrangements, the cassette management circuit 122 is structured to facilitate managing the transfer cassettes 108. In some arrangements, the cassette management circuit 122 is structured to detect by one or more sensors a parameter associated with each of the transfer cassettes 108. For example, the cassette management circuit 122 may track by one or more sensors, a location, a fill level, an operational status, or any other parameter associated with each of the transfer cassettes 108. The cassette management circuit 122 may detect, via the one or more sensors, the parameter in real-time/continuously (e.g., every second, every minute, at every event change, and so on) or periodically (e.g., every day, every hour, and so on). In some arrangements, the sensors may be positioned within a transaction device and/or positioned on or around the physical location of the transaction device. In some arrangements, the sensors may be positioned on or within each of the transfer cassettes 108. For example and as described below, each of the transfer cassettes 108 may include an internal sensor for detecting a fill level and/or a denomination of the transfer cassette 108.

In some arrangements, each of the transfer cassettes 108 is structured to store, dispense, and receive banknotes (e.g., currency such as dollars, pounds sterling, euros, and the like). Accordingly, the transfer cassettes 108 may include a storage area for storing banknotes and a apparatus for transferring banknotes to/from the storage area. The transfer cassettes 108 may include security features such that only an authorized user may access the storage area. In some arrangements, the transfer cassettes 108 may be structured to dispense and receive one or more types of transaction media such as banknotes, coins, checks, and/or any other transaction media.

In some arrangements, the transfer cassettes 108 includes one or more sensors structured to detect one or more parameters of banknotes stored by the transfer cassettes 108. For example, the one or more sensors may detect a denomination of the banknote(s), (e.g., by an optical character recognition (OCR) sensor, a size sensor). In some arrangements, the one or more sensors may detect a fill level of the storage area (e.g., by a weight sensor, a pressure sensor, a visual sensor, or other sensor). In some arrangements, the one or more sensors may detect a location of the transfer cassettes 108 (e.g., by a GPS, or other positioning sensor).

In some arrangements, the transfer cassettes 108 include an I/O circuit similar to or the same as the I/O circuit 120 for transferring data via the network 105. For example, the transfer cassettes 108 may be structured to provide sensor data to other components of the system 100 (e.g., via the I/O circuit and/or the network 105). The other components of the system 100 may accordingly use the sensor data provided by the transfer cassettes 108. In some arrangements, the transfer cassettes 108 also include an onboard computing system such that the sensor data may be interpreted or processed before the sensor data is provided to the other components of the system 100.

In some arrangements, the transaction device computing system 150 is a computing system for a transaction device (e.g., the transaction device 140 of FIG. 2, described in detail herein below). In some arrangements, the transaction device computing system 150 may be provided on or within the transaction device 140. For example, the transaction device computing system 150 may be fully contained within the transaction device 140. In some arrangements, the transaction device computing system 150 may be provided partially remotely from, or completely remote from the transaction device 140. For example, the transaction device computing system 150 may be implemented, at least partially, in a remote computing system such as a server or cloud computing system. In some arrangements, the system 100 includes more than one transaction device. In some arrangements, each transaction device includes a respective transaction device computing system 150. In some arrangements, one transaction device computing system 150 may be structured to control multiple transaction devices 140.

As shown in FIG. 1, the transaction device computing system 150 includes a processing circuit 150, an I/O circuit 160, one or more specialized processing circuits shown as a cassette management circuit 162 and a housing management circuit 164, and a database 170. In some arrangements, the processing circuit 152, the I/O circuit 160, and the database 170 are the same or substantially similar to the processing circuit 112, the I/O circuit 120, and the database 130 of the provider computing system 110. For example, the processing circuit 152 may include a processor, shown as processor 154, and memory, shown as memory 156, that is the same as or substantially similar to the processor 114 and memory 116.

The cassette management circuit 162 may be the same as or substantially similar to the cassette management circuit 122. For example, the cassette management circuit 162 may be structured to track the transfer cassettes 108. In some arrangements, the cassette management circuit 162 is structured to manage storage cassettes positioned within the transaction device 140. For example, the cassette management circuit 162 may track a denomination, fill level, and/or other parameters associated with the storage cassettes. In some arrangements, the cassette management circuit 162 may determine the parameters based on a detection made by one or more sensors (e.g., in the transaction device 140, or in the storage cassettes). In some arrangements, the cassette management circuit 162 may determine the parameters based on a predetermined sorting feature. For example, the cassette management circuit 162 may be structured to count the number of banknotes entering or exiting each of the storage cassettes. In some arrangements, the transaction device 140 may be structured to store a different denomination of banknote in each storage cassette such that the cassette management circuit 162 can determine the amount of banknotes of each denomination stored in each storage cassette.

Figure 3A:
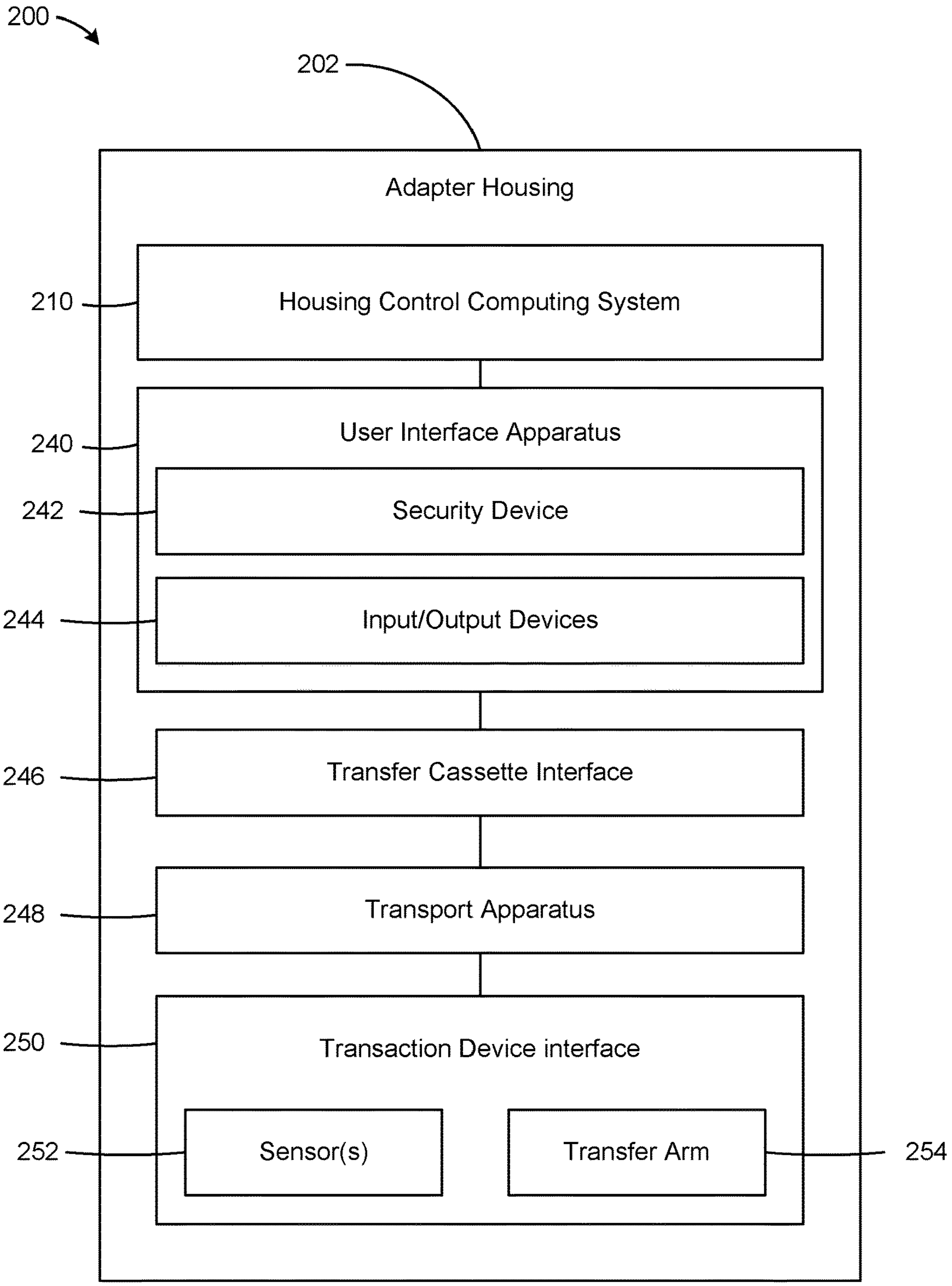
FIG. 3A is a block diagram of an adapter housing, according to an example arrangement.
Figure 3B:
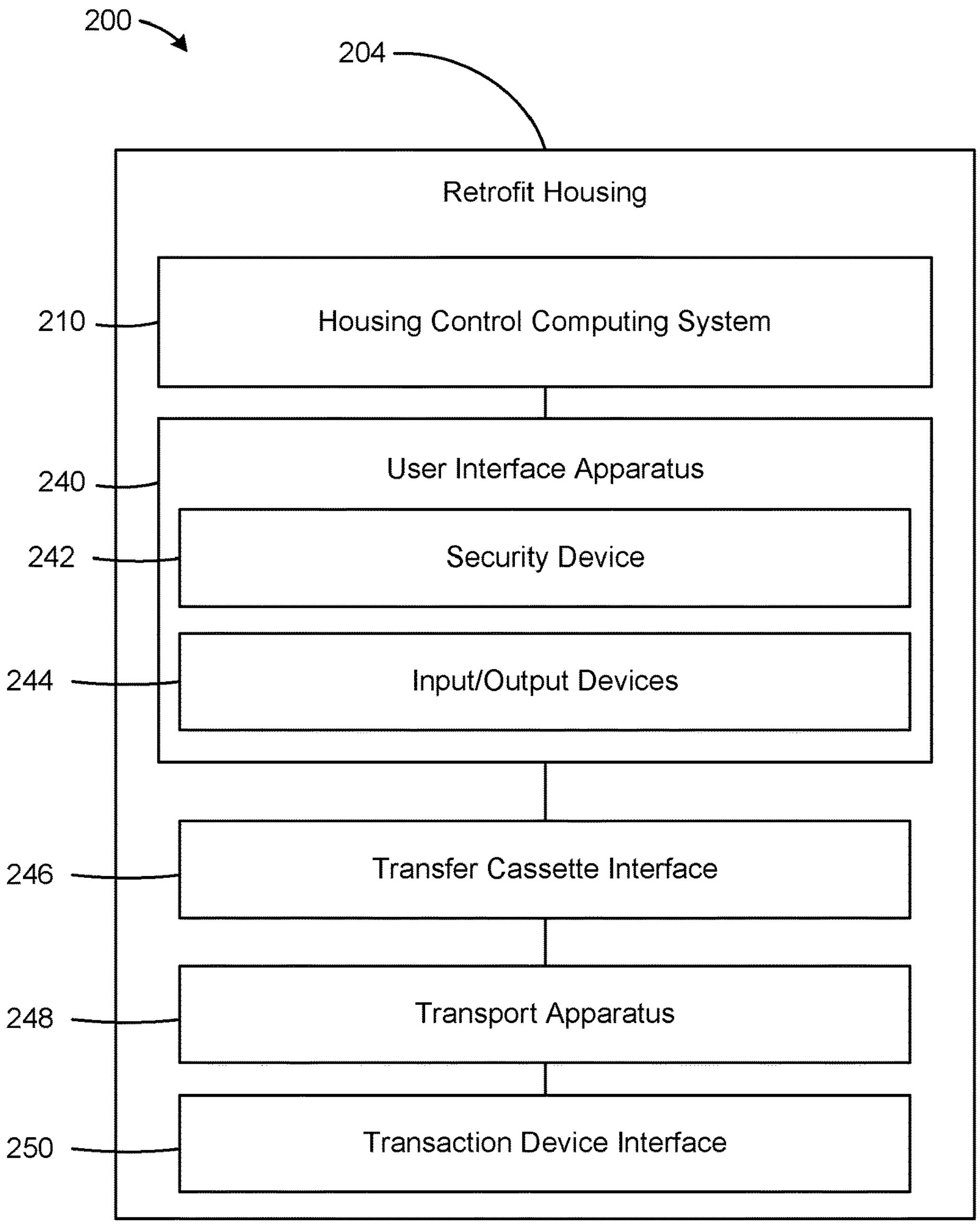
FIG. 3B is a block diagram of a retrofit housing, according to an example arrangement.
Figure 3C:
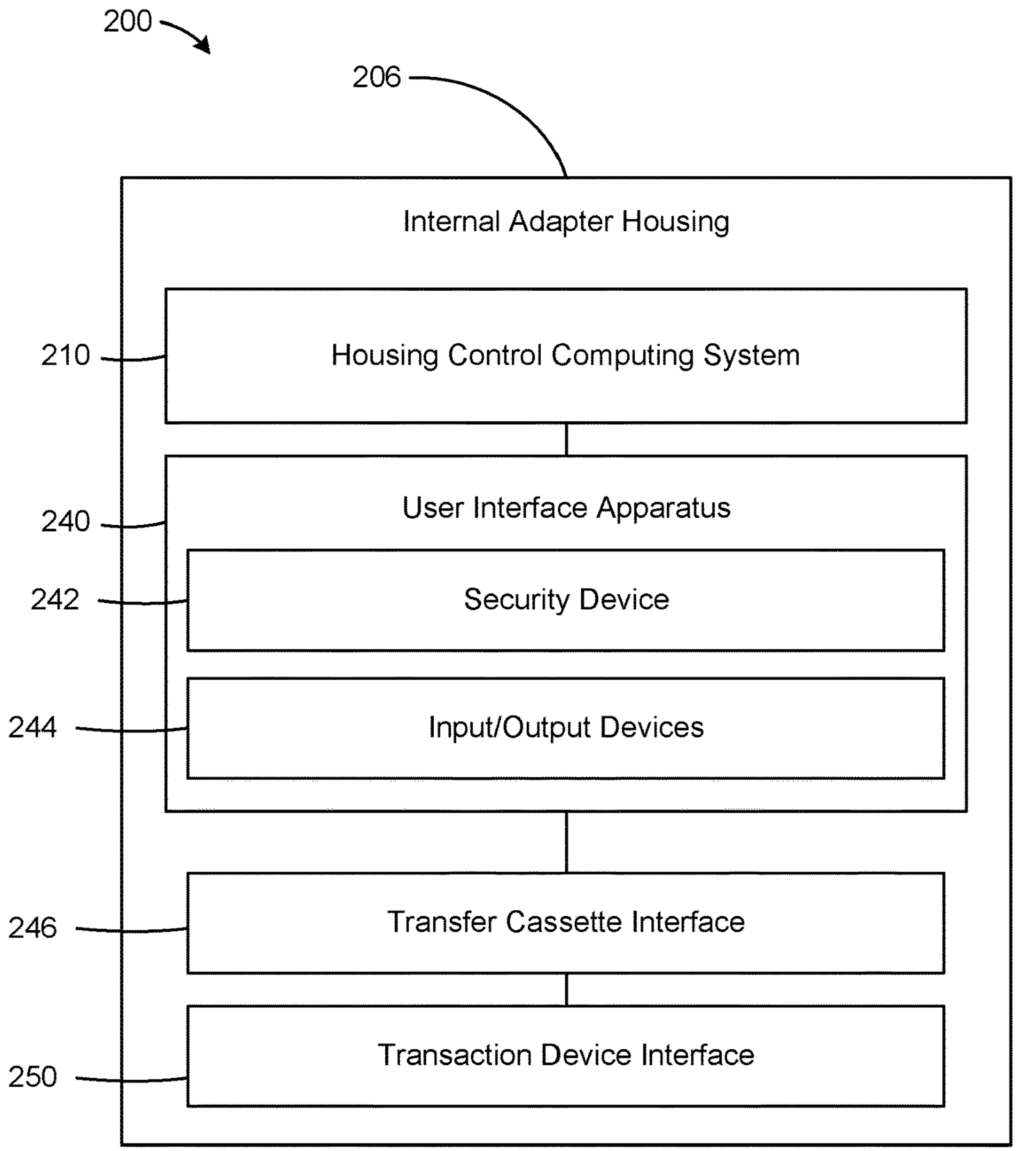
FIG. 3C is a block diagram of an internal adapter housing, according to an example arrangement.

The housing management circuit 164 is structured to facilitate communications with the housing control computing system 210. For example, when a housing device, such as the housing device 200 of FIG. 3A-3C, is installed or positioned near the transaction device 140, the adapter management circuit 164 may facilitate communication (e.g., via the I/O circuit 160 and/or the network 105) with the housing control computing system 210. In some arrangements, the adapter management circuit 164 may be structured to facilitate transferring sensor data between the transaction device computing system 150 and the housing control computing system 210.

In some arrangements, the transaction device computing system 150 is structured to facilitate transactions for a user (e.g., a customer) such as a deposit transaction, a withdrawal transaction, a purchase transaction and so on. Accordingly, the transaction device computing system 150 may include any combination of hardware and software such as specialized circuits, programs, executables, or any other hardware and/or software necessary to facilitate the transaction operations in the database 170.

In some arrangements, the database 170 is structured to retrievably store a service executable 172. The service executable 172 may be structured to facilitate servicing the transaction device 140. For example, the transaction device computing system 150 may be placed in a service mode manually (e.g., by a user input) or automatically (e.g., responsive to an indication from another component of the system 100). The transaction device computing system 150 may retrieve and execute the service executable 172 to initiate the service mode. In some arrangements, the service mode may prevent a user (e.g., a customer) from accessing the transaction operations of the transaction device computing system 150. In some arrangements, the service executable 172 may require a user input to verify that the user (e.g., bank employee) is authorized to initiate and/or utilize the service executable 172.

In some arrangements, the housing control computing system 210 is a computing system for a housing device (e.g., the housing device 200 of FIG. 3A-3C, described in detail herein below). In some arrangements, the housing control computing system 210 may be provided on or within the housing device 200. For example, the housing control computing system 210 may be partially or fully contained within the housing device 200. In some arrangements, the housing control computing system 210 may be provided partially remote from, or completely remote from the housing device 200. For example, the housing control computing system 210 may be implemented, at least partially, in a remote computing system such as a server or cloud computing system. In some arrangements, the system 100 includes more than one housing device 200. In some arrangements, each housing device 200 includes a respective transaction device computing system 150. In some arrangements, one housing control computing system 210 may be structured to control housing devices 200.

As shown in FIG. 1, the housing computing system 210 includes a processing circuit 212, an I/O circuit 220, one or more specialized processing circuits shown as a cassette management circuit 222 and a transaction device circuit 224, and a database 230. In some arrangements, the processing circuit 212, the I/O circuit 220, and the database 230 are the same or substantially similar to the processing circuit 112, the I/O circuit 120, and the database 130 of the provider computing system 110. For example, the processing circuit 210 may include a processor, shown as processor 212, and memory, shown as memory 216, that is the same as to or substantially similar to the processor 114 and memory 116.

The cassette management circuit 222 may be the same as or substantially similar to the cassette management circuit 122 and/or the cassette management circuit 162. For example, the cassette management circuit 222 may be structured to track the transfer cassettes 108. In some arrangements, the cassette management circuit 222 is structured to manage a transfer cassette 108 positioned within a housing device 200. For example, the cassette management circuit 222 may track a denomination, fill level, and/or other parameters associated with the transfer cassette 108. In some arrangements, the cassette management circuit 222 may determine the parameters based on a detection made by one or more sensors (e.g., a sensor in the housing device 200, or a sensor in the transfer cassette 108). In some arrangements, the cassette management circuit 222 may determine the parameters based on a predetermined sorting feature/system component. For example, the cassette management circuit 222 may be structured to count the number of banknotes entering or exiting the transfer cassette 108.

In some arrangements, the database 230 includes a service executable 232. The service executable 232 may be substantially similar to or the same as the service executable 172. For example, the service executable 232 may include pre-compiled or otherwise computer-executable instructions that are executable by the processing circuit 152 and, when executed by the processing circuit 152, cause the transaction device computing system to enter a service mode. In some arrangements, the service executable 232 is structured to also be executable by the processing circuit 212 and, when executed by the processing circuit 212, to cause the housing control computing system 210 to initiate a service operation. The service operation may include transferring banknotes to and from the transaction device 140.

The transaction device circuit 224 is structured to facilitate interfacing with the transaction device computing system 150. For example, when the housing device 200 is installed or positioned near the transaction device 140, the transaction device circuit 224 may facilitate communication (e.g., via the I/O circuit 220 and/or the network 105) between the housing control computing system 210 and the transaction device computing system 150. In some arrangements, the transaction device circuit 224 may be structured to facilitate a transfer of sensor data between the transaction device computing system 150 and the housing control computing system 210.

Figure 2:
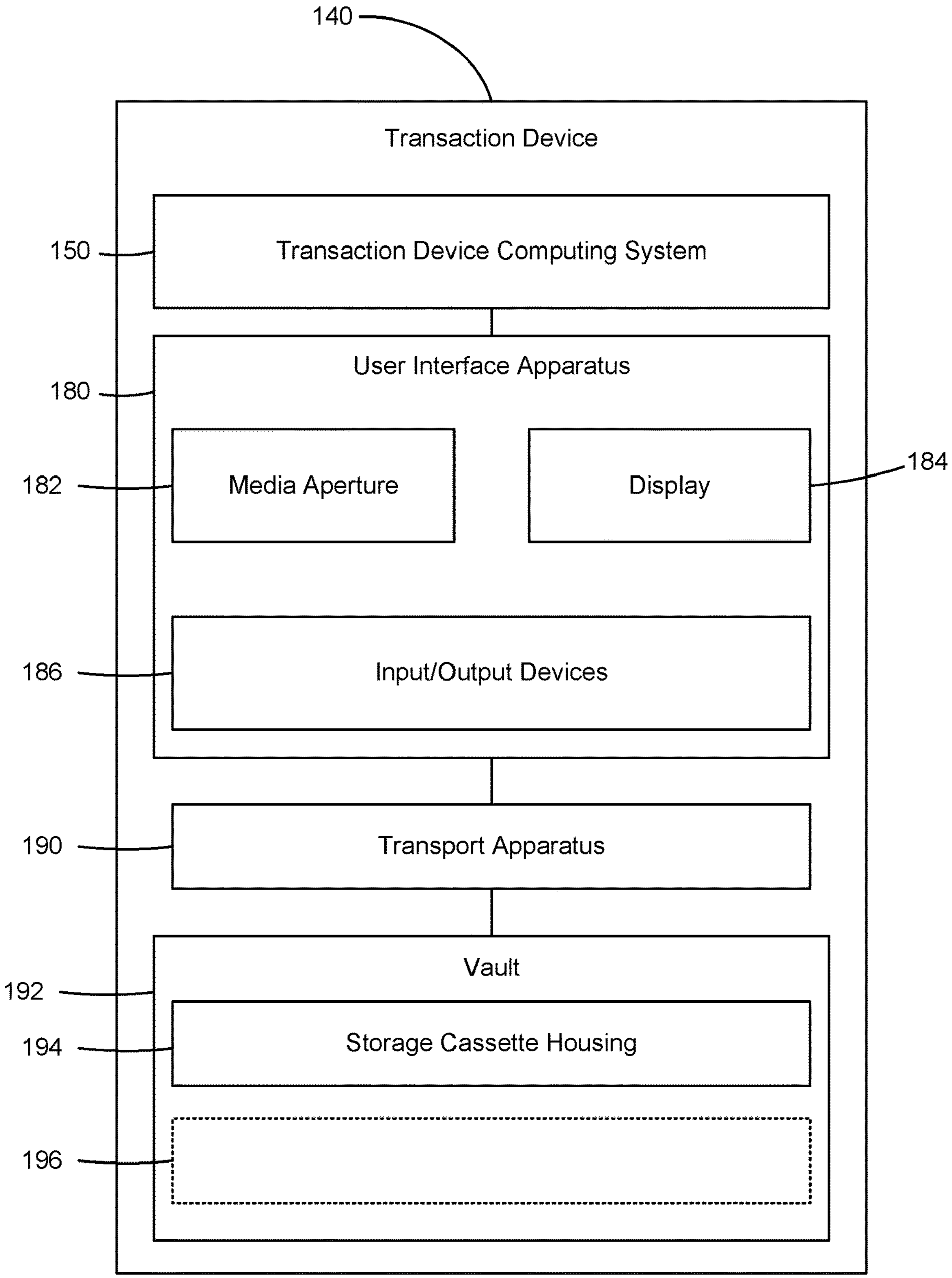
FIG. 2 is a block diagram of a transaction device, according to an example arrangement.

FIG. 2 is a block diagram of a transaction device 140, according to an example arrangement. In some arrangements, the transaction device 140 may include one or more of an automated teller machine (ATM), a teller station, a point of sale (POS) device, and/or any other transaction device or cash recycling device. In some arrangements and as shown in FIG. 2, the transaction device 140 includes the transaction device computing system 150 of FIG. 1. In some arrangements, the transaction device computing system 150 is provided at least partially locally (e.g., on or within the transaction device 140). In some arrangements, the transaction device computing system is provided completely remote form the transaction device 140. In some arrangements, and as shown in FIG. 2, the transaction device 140 also includes a user interface apparatus 180, a transport apparatus 190, and a vault 192. The user interface apparatus 180 includes a media aperture 182, a display 184, and one or more input/output devices 186. The user interface apparatus 180 may be positioned on a user (e.g., customer) facing side of the transaction device 140 such that the user may interact with the transaction device (e.g., to perform a transaction).

The media aperture 182 is structured to facilitate dispensing and/or receiving transaction media such as banknotes, coins, checks, and the like. In some arrangements, the media aperture 182 includes a media pocket that a user (e.g., a customer) can reach into to pick up or drop transaction media. In some arrangements, the user interface apparatus 180 includes one or more media apertures 182. For example, in some arrangements, the user interface apparatus 180 may include a first media aperture 182 structured and/or designated for dispensing transaction media and a second media aperture 182 structured and/or designated for receiving transaction media. In some arrangements, the user interface apparatus 180 may include a first media aperture 182 structured and/or designated for dispensing and/or receiving a first type transaction media (e.g., banknotes) and a second media aperture 182 structured and/or designated for dispensing and/or receiving a second type of transaction media (e.g., coins). In some arrangements, the media aperture 182 includes one or more sensors structured to detect a parameter relating to the transaction media received or dispensed by the media aperture 182. For example, a media aperture sensor may detect a denomination, an amount, a legitimacy (e.g., whether the transaction media is likely to be legitimate or counterfeit), a quality, or any other parameter of the transaction media.

The display 184 is structured to display information to a user. In some arrangements, the display 184 is structured to communicatively couple to the transaction device computing system 150 (e.g., via the I/O circuit 160 of FIG. 1) such that the display 184 can display a user interface generated by the transaction device computing system 150. In some arrangements, the display 184 is also structured to receive a user input. In some arrangements, the user input may be provided by an additional device (e.g., via the I/O device 186, the transaction device computing system 150, and/or a component of the I/O circuit 160 of FIG. 1). In some arrangements, the display 184 is structured as a touchscreen display such that the user input may be provided via the display 184. In these arrangements, the display 184 is structured to provide the user input to the transaction device computing system 150 (e.g., via the I/O circuit 160).

In some arrangements, the display 184 is structured to display a user interface (UI). The user interface displayed by the display 184 may be generated by the transaction device computing system 150. The user interface may include a transaction user interface structured to facilitate a transaction for a user (e.g., a customer). The transaction user interface may include various UI elements structured to display information associated with the transaction such as a transaction type, a transaction amount, and/or any other UI elements. In some arrangements, the display 184 is structured to display a service mode user interface such as the service mode user interface 400 of FIG. 8, described in detail herein below. In some arrangements, the service mode user interface 400 is structured to facilitate a service mode operation such as extracting excess banknotes or replacing depleted banknotes.

In some arrangements, the I/O devices 168 are structured to facilitate user interaction with the transaction device computing system 150. The I/O devices 168 may be communicatively coupled to the transaction device computing system 150 (e.g., via the I/O circuit 160) such that an input received by the I/O devices 168 may be provided to the transaction device computing system 150 and/or the transaction device computing system 150 may provide an output to the I/O devices 168. In some arrangements, the I/O devices 186 may include devices for facilitating a transaction at the transaction device 140. For example, the I/O devices may include a card reader (e.g., for receiving a transaction card such as an ATM card, a debit card, a credit card, or a gift card and reading a magnetic strip, a security chip, or contactless input), typing interface (e.g., a keypad, a keyboard, and/or a touchscreen keyboard), a biometric sensor (e.g., a fingerprint sensor, an eye sensor, and the like), a speaker, a microphone, a radio frequency identification (RFID) sensor, and/or any other input or output device.

The transport apparatus 190 is structured to facilitate transporting transaction media between the user interface apparatus 180 and the vault 192. Specifically, the transport apparatus 190 may transport transaction media between the media aperture 182 and one or more storage cassettes stored in the vault 192. In some arrangements, the transport apparatus 190 includes belts, rollers, mechanical arms, or any other transport device for transporting transaction media between the vault 192 and the user interface apparatus 180. In some arrangements, the transport apparatus 190 includes belts and/or rollers for transporting paper transaction media such as banknotes or checks. In some arrangements, the transport apparatus 190 includes a coin receiving and sorting apparatus. For example, the transport apparatus 190 may include slotted tracks, conveyer belts, rollers, and the like for transporting and/or sorting coins. In some arrangements, the transport apparatus includes one or more mechanical arms. As used herein, the terms mechanical arms, transport arms, and similar terms refer to an extendable/retractable or repositionable portion of a transport apparatus that is structured to facilitate transporting transaction media. The mechanical arms may include belts, rollers, and/or any other transport device. The transport devices provided on the mechanical arms may be structured to be adjustable and/or deformable such that the transport devices can transport the transaction media when the mechanical arm is extended, retracted, or repositioned in any position. The mechanical arms also may be structured to grab or release transaction media (e.g., by a grabber arm, a claw, or other grasping apparatus). In some arrangements, the transport apparatus 190 is also structured to couple to a storage cassette housing 194 of the vault 192. For example, the transport apparatus 190 may be structured to retrieve and/or store transaction media in one or more storage cassettes in the storage cassette housing 194.

The vault 192 is a storage area of the transaction device 140. In some arrangements, the vault 192 is structured to dispense, receive, and store transaction media, such as and/or including banknotes. The vault 192 may include security features such as a lockable portal (e.g., door) to prevent or mitigate against unauthorized access to the vault 192. In some arrangements, the vault 192 is structured to couple to the transport apparatus 190 such that the transport apparatus 190 can retrieve transaction media from or provide transaction media to the vault 192.

In some arrangements, the vault 192 includes a storage cassette housing 194. The storage cassette housing 194 is a portion of the vault 192 and is structured to store one or more storage cassettes. In some arrangements, the storage cassette housing 192 is structured to interface with the transport apparatus 190 to facilitate transferring transaction media between the storage cassettes in the cassette housing 194 and the media aperture 182. In some arrangements, the storage cassette housing 194 includes slots and/or shelves that interface with the transport apparatus 190. The storage cassettes may dock with or couple to the slots of the cassette housing 194 such that the storage cassettes may interface with the transport apparatus 190 directly. In some arrangements, a user (e.g., a provider employee) may insert or dock a storage cassette into an empty slot of the storage cassette housing 194. In some arrangements, the storage cassettes may be retrievably stored by the storage cassette housing 194 such that the storage cassettes may be removed (e.g., by a user) from the storage cassette housing 194. Accordingly, the storage cassettes may be added, removed, or replaced by a user such as a provider employee. In some arrangements, the storage cassette housing 194 includes one or more security features such that only an authorized user may insert or remove a storage cassette from the storage cassette housing 194. In some arrangements, the security feature may include a keyed lock, a keypad, a biometric sensor, and the like.

In some arrangements, the vault 192 defines an area 196. In some arrangements, the area 196 may be separate from the storage cassette housing 194. In some arrangements, the area 196 at least partially overlaps the storage cassette housing 196. In some arrangements, the area 196 is substantially empty (e.g., free of storage cassettes) and one or more devices (e.g., the retrofit housing 204 of FIG. 3B) may be placed in the area 196. In some arrangements, the vault 192 does not include an area 196 and/or the area 196 may be defined completely by the storage cassette housing 194. In the latter arrangements, the internal housing adapter 206 may be positioned in the area 196.

Referring to FIGS. 3A-3C in general, block diagrams of various example arrangements of a housing device 200 are shown as an adapter housing 202, a retrofit housing 204, and an internal adapter housing 206 in FIGS. 3A, 3B, and 3C, respectively. According to the various example arrangements shown herein, the housing devices 200 may include similar components or features represented by similar blocks and referenced by similar numerals. For example, each or some of the housing devices 200 may include a user interface apparatus 240 as shown in FIGS. 3A-3C. It should be understood that the blocks and reference numerals that refer to a particular component or feature may be implemented differently on each of the housing devices 200. For example, the user interface apparatus 240 may be positioned differently, include different subcomponents, and/or have a different appearance when implemented on the adapter housing 202, the retrofit housing 204 and the internal adapter housing 206, respectively.

In some arrangements, the housing devices 200 are structured to facilitate a service operation for a transaction device 140. In some arrangements, the housing devices 200 are structured to facilitate the service operation for any type of transaction device 140 such as an ATM, a cash recycler, a POS device, and the like. In some arrangements, the service operation includes a filling operation that includes transferring transaction media such as banknotes from the transfer cassettes 108 to the transaction device 140 (e.g., to replace depleted transaction media). In some arrangements, the service operation includes a removal operation that includes transfer transaction media from the transaction device 140 to the transfer cassettes 108 (e.g., to reduce excess storage). In some arrangements, the service operation includes any combination of a filling operation and a removal operation.

Now specifically referring to FIG. 3A, FIG. 3A is a block diagram of an adapter housing 202, according to an example arrangement. The adapter housing 202 is a housing for facilitating a service operation. In some arrangements, the adapter housing 202 is structured to facilitate interfacing the transfer cassettes 108 of FIG. 1 with the transaction device 140 of FIG. 2. For example, the adapter housing 202 may be structured to receive one or more of the transfer cassettes 108 and facilitate transferring transaction media between the transfer cassette 108 and the transaction device 140. In some arrangements, the adapter housing 202 is structured to couple to a front (e.g., user facing) side of the transaction device 140. The adapter housing 202 may facilitate transferring transaction media to and from the transaction device 140 via the media aperture 182.

In some arrangements and as shown in FIG. 3A, the adapter housing 202 includes the housing control computing system 210 of FIG. 1. In some arrangements, the housing control computing system 210 is provided at least partially locally (e.g., on or within the adapter housing 202). In some arrangements, the housing control computing system 210 is provided completely remote form the adapter housing 202. In some arrangements, and as shown in FIG. 3A, the adapter housing 202 also includes a user interface apparatus 240, a transfer cassette interface 246, a transport apparatus 248, and a transaction device interface 250.

The user interface apparatus 240 is a portion of the exterior of the adapter housing 202. In some arrangements, the user interface apparatus 240 includes a security device 242 and one or more input/output devices 244. In some arrangements, the user interface apparatus 240 may be positioned on one or more surfaces of the adapter housing 202. For example, the security device 242 may be positioned on a first surface of a first side of the adapter housing 202, a first device of the one or more input/output devices 244 may be positioned on a second surface of the first side of the adapter housing 202, and a second device of the one or more input/output devices 244 may be positioned on a first surface of a second side of the adapter housing 202. In some arrangements, the security device 242 and/or the I/O devices 244 are structured to communicatively couple to the housing control computing system 210. For example, the I/O devices 244 may be wired (e.g., when the housing control computing system 210 is provided at least partially in with the adapter housing 202) or may be wirelessly (e.g., when the housing control computing system 210 is provided at least partially remote from the adapter housing 202) coupled to the I/O circuit 220.

In some arrangements, the security device 242 is structured to prevent or mitigate against an unauthorized user from accessing the adapter housing 202. For example, the security device 242 may be structured to prevent or mitigate against an unauthorized user accessing a transfer cassette 108 that is docked with the adapter housing 202. The security device 242 may be structured to allow an authorized user to access the transfer cassette 108 such that the authorized user can insert or remove the transfer cassette 108 in/from the adapter housing 202 and/or dock/remove the adapter housing 202 with/from the transaction device 140. In some arrangements, the security device 242 may include one or more of a keyed lock, a keypad, a biometric sensor, and/or any other security device.

The I/O devices 244 may include one or more devices structured to provide operational status output and/or receive input from a user. In some arrangements, the I/O devices 244 are structured to receive user inputs and provide the user inputs to the housing computing system 210 (e.g., via the I/O circuit 220). In some arrangements, the I/O devices 244 are structured to receive an output from the housing control computing system 210 (e.g., via the I/O circuit 220) and provide or display the output to a user.

In some arrangements, the I/O devices 244 may include one or more status indication devices such as light emitting diodes (LEDs), displays, or other indication devices. In some arrangements, the I/O devices 244 may indicate one or more of (i) whether a transfer cassette 108 is interfaced with the adapter housing 202, (ii) a fill level of the transfer cassette 108 that is interfaced with the adapter housing 202, (iii) whether the adapter housing 202 is interfaced with the transaction device 140, (iv) whether the adapter housing 202 is interfaced with the correct transaction device 140, or any other operational status of the adapter housing 202, a transfer cassette 108 docked with the adapter housing 202 and/or the transaction device 140 that the adapter housing 202 is docked with. In some arrangements, the I/O devices 244 may include any other input device or output device.

In some arrangements, the I/O devices 244 include a communication device structured to interface with the I/O circuit 160 of the transaction device computing system 150 of FIG. 1. For example, the I/O devices 244 may include an RFID tag or sensor, a Bluetooth device, a near field communication (NFC) device, or any other communication device structured to interface with the I/O circuit 160. In some arrangements, when a user positions the adapter housing 202 near the transaction device 140, the I/O devices 244 may communicate with the I/O circuit 160 and cause the housing control computing system 210 to communicatively couple to the transaction device computing system 150. In some arrangements, the I/O devices 244 are structured to cause the housing control computing system 210 to communicatively couple to the transaction device computing system 150 responsive to the adapter housing 202 physically coupling to the transaction device 140. For example, the I/O devices 244 may be structured to provide a signal to the transaction device computing system 150 to initiate a communication interface when the adapter housing 202 is physically connected to the transaction device 140. In some arrangements, the interface between the adapter housing 202 and the transaction device 140 is facilitated by the transaction device interface 150. Transfer cassettes may likewise include an RFID tag or sensor, a Bluetooth device, a near field communication (NFC) device, or any other communication device structured to interface with the I/O circuit 160. In some arrangements, a computing system may store a predetermined list of allowable transaction device and adapter housing, transaction device and transfer cassette, and/or transfer cassette and adapter housing combinations and an alert (e.g., in the form of a status light on the transaction device, an automatic lock to prevent any transfers of banknotes, etc.) may be generated if a non-recognized adapter housing and/or transfer cassette are coupled to the transaction device. Advantageously, such configurations may provide an additional layer of security to prevent theft or unauthorized transfers of banknotes.

The transfer cassette interface 246 can be a receptacle for receiving (i.e. docking) a transfer cassette 108 with the adapter housing 202. In some arrangements, the transfer cassette interface 246 includes one or more sensors structured to detect whether a transfer cassette 108 is docked in the transfer cassette interface 246. In some arrangements, the transfer cassette interface 246 includes a security feature such as a lock to substantially prevent or mitigate against an unauthorized user from removing or inserting a transfer cassette from/into the housing 202. The security feature may be operable via the security device 244 of the adapter housing 202 such that an authorized user may provide a security token to the security device 244 to unlock the transfer cassette interface 246 and dock or remove a transfer cassette 108 with/from the adapter housing 202. In some arrangements, the transfer cassette interface 246 may be structured to receive one or more transfer cassettes. In these arrangements, the transfer cassette interface 246 may have a number of portals (e.g., openings, doors, and the like) for each transfer cassette 108 that the transfer cassette interface 146 can receive.

In some arrangements, the transfer cassette interface 246 is structured to couple to the transport apparatus 248. In these arrangements, the transfer cassette interface 246 is structured to facilitate operatively coupling the transport apparatus 248 with a docked transfer cassette 108. For example, the transfer cassette interface 246 may facilitate coupling the transport apparatus 248 to the transfer cassette 108 when the transfer cassette 108 is docked with the adapter housing 202 via the transfer cassette interface such that the transport apparatus 248 is operable to retrieve transaction media from or provide transaction media to the transfer cassette 108.

The transport apparatus 248 includes any combination of transport belts, conveyors, rollers, transport arms, and/or any other transport devices for transporting transaction media between a docked transfer cassette 108 (e.g., via the transfer cassette interface 264) and the transaction device 140 (e.g., via the transaction device interface 250).

In some arrangements, the transport apparatus 248 is structured to couple to a docked transfer cassette 108 via the transfer cassette interface. When coupled in this way, the transport apparatus 248 is operable to access the storage of the transfer cassette 108 to retrieve or store transaction media therein. For example, the transport apparatus 248 may retrieve banknotes stored in the transfer cassette 108 and/or provide banknotes to the transfer cassette 108.

In some arrangements, the transport apparatus 248 is structured to couple to a portion of the transaction device 140. Specifically, the transport apparatus 248 is structured to couple to the transaction device 140 via the transaction device interface 250. In some arrangements, the transaction device interface 250 may include at least a portion of the transport apparatus 248. For example, the transaction device interface 250 may include a transfer arm 254. In some arrangements, when the adapter housing 202 is installed on the transaction device 140, the transport apparatus 248 is structured to couple to a portion of the transaction device 140 such that the transport apparatus 248 is operable to facilitate transferring transaction media to/from the transaction device. In some embodiments, when the transaction device 140 receives the transaction media form the transport apparatus 248, the transaction device transport apparatus 190 is structured to facilitate transporting the transaction media within the transaction device 140, as described above.

In some arrangements, the transaction device interface 250 does not include any portion of the transport apparatus 248. In these arrangements, the transport apparatus 248 is structured to directly couple to a portion of the transaction device 140. For example, the transport apparatus 248 may directly couple to at least one of the transaction device transfer apparatus 190 (e.g., via the media aperture 182 or via storage cassette housing 194), and/or the transport apparatus 248 may be appended onto the transaction device transfer apparatus 190 when the housing device 200 is installed on/in the transaction device 140.

The transaction device interface 250 is an interface for operably coupling the adapter housing 202 to the transaction device 140. In some arrangements, and as shown in FIG. 3A, the transaction device interface includes one or more sensors 252 and a portion of the transport apparatus 248 shown as transfer arm 254. In some arrangements, transaction device interface 250 of the adapter housing 202 is structured to interface with a front facing (i.e. customer facing) portion of the transaction device 140. For example, the transaction device interface 250 may be structured to interface with the media aperture 182 of the transaction device 140 (i.e., the transaction device interface 250 is a media aperture interface). In some arrangements, the transaction device interface 250 may be structured to interface with the media aperture 182 if the media aperture 182 is a standardized media aperture 182. In some arrangements, the transaction device interface 250 is adaptable (e.g., by changing the extension length of the transfer arm 254) such that the transaction device interface 250 is operable to interface with the media aperture 182 even if the media aperture 182 is not standardized.

In some arrangements, the transaction device interface 250 includes one or more fasteners (e.g., screws, bolts, magnetic fasteners, snap fit fasteners, and the like) structured to removably couple the adapter housing 202 to the transaction device 140. In some arrangements, the transaction device interface 250 includes a tool-less design such that the adapter housing 202 may be coupled to the transaction device without the use of tools.

The sensor(s) 252 may be structured to detect one or more parameters of a transfer or service operation. In some arrangements the sensors 252 are communicatively coupled to the housing control computing system 210 and can provide sensor data to the housing control computing system 210. The parameters may include one or more parameters associated with transaction media that passes through the transaction device interface 250. For example the sensors 252 may detect a denomination, amount, quality, legitimacy, or other parameters of transaction media as it passes through the transaction device interface 250. In some arrangements, the parameters may include an indication of whether the adapter housing 202 is properly installed on the transaction device 140. For example, the sensors 252 may detect whether the adapter housing 202 is properly coupled (e.g., via the one or more fasteners) to the transaction device 140.

In some arrangements, the sensors 252 may detect one or more parameters related to the media aperture 182. For example, the sensors 252 may detect whether banknotes are present in or near the media aperture 182, whether the media aperture 182 is open or closed, and/or any other parameter related to the media aperture 182. In some arrangements the sensors 252 may detect whether a foreign object such as debris, non-transaction media items, or a user (e.g., a customer, a provider employee, etc.) is at least partially positioned between the adapter housing 202 and the transaction device 140. In these arrangements, the sensors 252 may provide an indication to the housing control computing system 210 that a foreign object is between the adapter housing 202 and the transaction device 140 and/or cause the housing control computing system 210 to substantially prevent a service operation form being performed responsive to detecting a foreign object between the adapter housing 202 and the transaction device 140.

In some arrangements, the transaction device interface 250 includes a transfer arm 254. In some arrangements, the transfer arm 254 is a portion of the transport apparatus 248 provided on or near the transaction device interface 250. In some arrangements, the transfer arm 254 is a separate apparatus and is coupled to the transport apparatus 248. In some arrangements, the transfer arm 254 is structured to be extendable through an opening of the transaction device interface 150 such that the transfer arm 254 is operable to reach near or into the media aperture 182. For example, the transfer arm 254 may be operable between an extended position (e.g., when the adapter housing 202 is coupled to the transaction device 140) and a retracted position (e.g., when the adapter housing is not coupled to the transaction device 140).

As described above, the transfer arm 254 may include any combination of rollers, belts, or other transfer devices structured to facilitate transferring transaction media. In some arrangements, the transfer arm 254 includes rollers, belts, and/or other transfer devices such that, when the transfer arm 254 is in an extended position, transfer arm 254 may facilitate retrieving/providing transaction media from/to the transaction device 140 via the media aperture 182. In some arrangements, the transfer arm 254 may receive transaction media from the transport apparatus 248 and facilitate inserting the transaction media into the media aperture 182. As described above, the transaction device transport apparatus 190 is operable to retrieve the transaction media provided in the media aperture 182. In some arrangements, the transfer arm 254 may receive transaction media from the media aperture 182 and provide the transaction media to the transport apparatus 248.

FIG. 3B is a block diagram of a retrofit housing 204, according to an example arrangement. In some arrangements and as shown in FIG. 3B, the retrofit housing 204 includes similar components as the adapter housing 202. For example, the retrofit housing 204 may include a housing control computing system 210 (provided locally, partially locally, or remotely), a user interface apparatus 240, a transfer cassette interface 246, a transport apparatus 248, and a transaction device interface 250. In some arrangements, the user interface apparatus 240, security device 242, the I/O devices 244, the transfer cassette interface 246, and the transport apparatus 248 are substantially similar to or the same as the similar components of the adapter housing 202.

In some arrangements, the retrofit housing 204 is structured to be positioned within the vault 192. For example, the retrofit housing 204 may be positioned in the area 196. In some arrangements, the transaction device transport apparatus 190 is "retrofitted" (i.e., reconfigured) to receive the retrofit housing 204. In some arrangements, the transaction device interface 250 may be structured to facilitate coupling the housing transport apparatus 248 to the transaction device transport apparatus 190 such that the housing transport apparatus 248 is operable to transfer transaction media to and from the transaction device 140 via the transaction device transport apparatus 190.

FIG. 3C is a block diagram of an internal adapter housing 206, according to an example arrangement. In some arrangements and as shown in FIG. 3C, the internal adapter housing 206 includes similar components as the adapter housing 202 and/or the retrofit housing 204. For example, the internal adapter housing 206 may include a housing control computing system 210 (provided locally, partially locally, or remotely), a user interface apparatus 240, a transfer cassette interface 246, a transport apparatus 248, and a transaction device interface 250. In some arrangements, the user interface apparatus 240, security device 242, the I/O devices 244, and the transfer cassette interface 246, are substantially similar to or the same as the similar components of the adapter housing 202 and/or the retrofit housing 204.

In some arrangements, the internal adapter housing 206 is structured to be positioned within the vault 192. For example, the internal adapter housing 206 may be positioned on or near the storage cassette housing 194. In some arrangements, the internal adapter housing 206 is structured to be positioned on or dock with a cassette slot of the storage cassette housing 194. In some arrangements, the transaction device interface 250 may be structured to facilitate coupling the transfer cassette interface 246 to the transaction device transport apparatus 190 via the storage cassette housing 194 such that the transaction device transport apparatus 190 is operable to transfer transaction media to and from the transfer cassette 108.

Figure 4A:
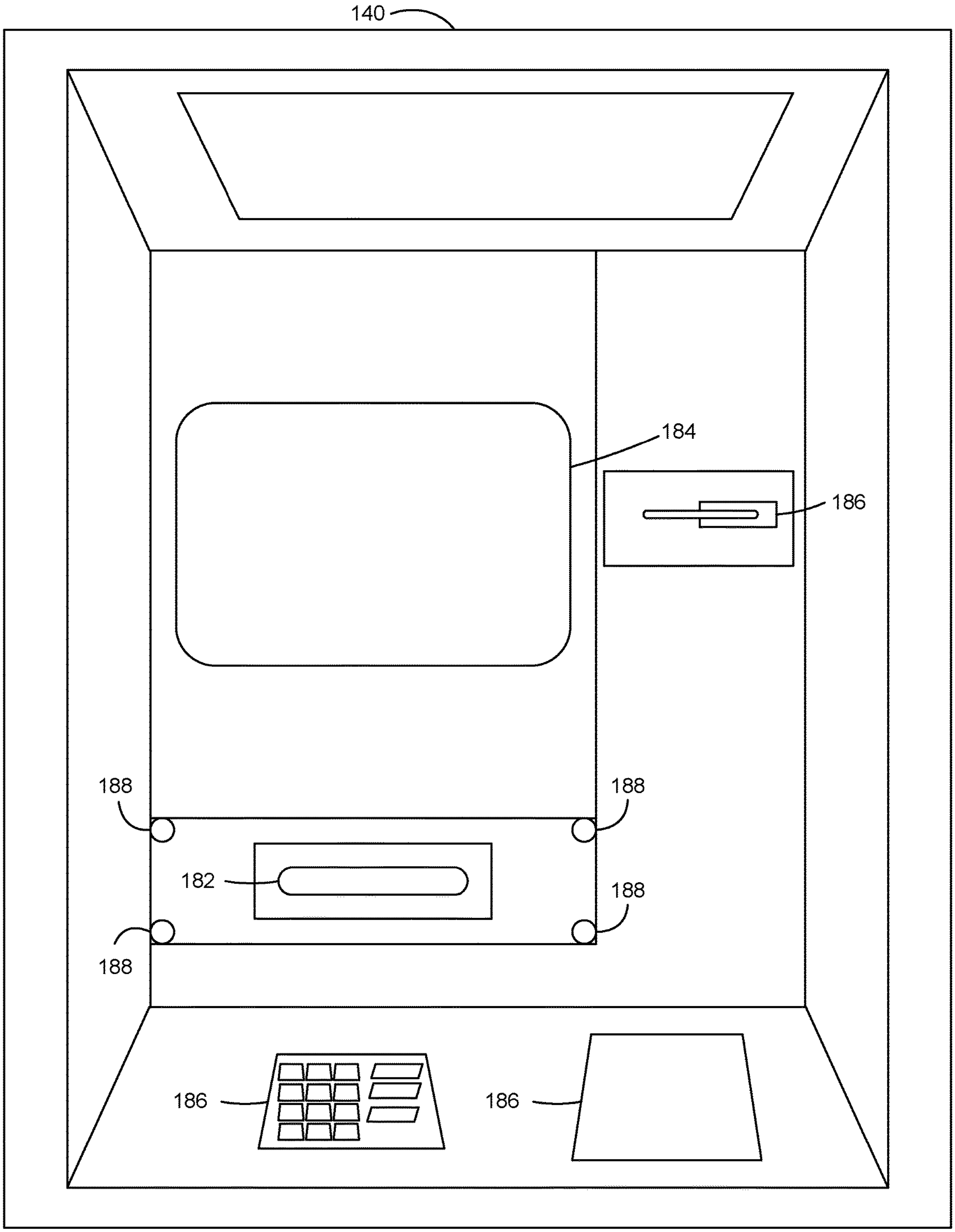
FIG. 4A is a front elevated view of the transaction device of FIG. 2, according to an example arrangement.
Figure 4B:
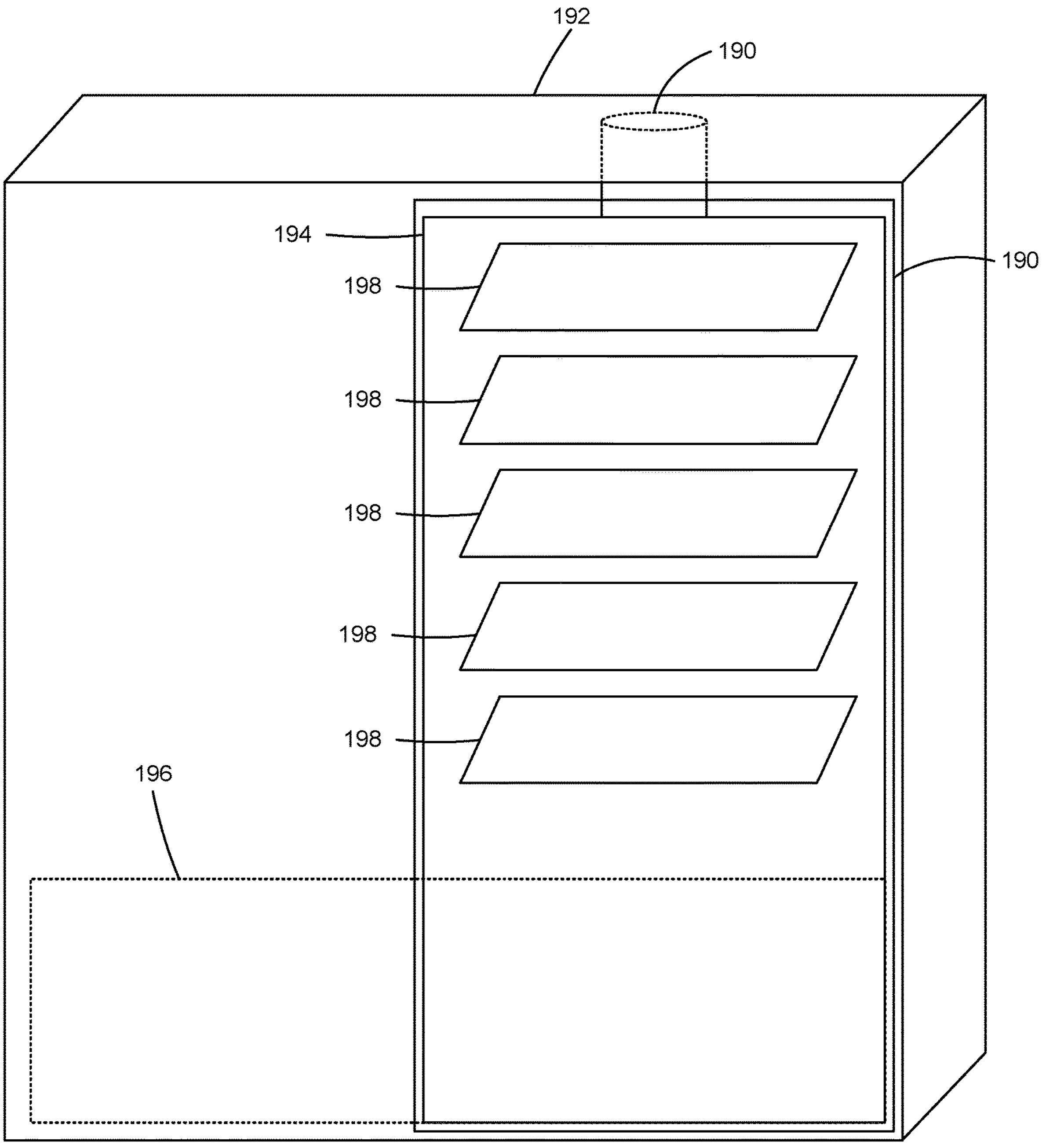
FIG. 4B is an internal view of the transaction device of FIG. 2, according to an example arrangement.

Now referring to FIGS. 4A and 4B, the transaction device 140 is shown according to various example arrangements. Specifically a front, user (e.g., customer) facing portion of the transaction device 140 is shown in FIG. 4A and an internal portion (e.g., vault 192) of the transaction device 140 is shown in FIG. 4B. In some arrangements, and as shown in FIGS. 4A and 4B, the transaction device 140 is an ATM; however, it should be understood that the transaction device 140 may be any transaction device or cash recycler such as a POS device, a teller station, and the like.

FIG. 4A is a front elevated view of the transaction device 140 of FIG. 2, according to an example arrangement. As shown in FIG. 4A, the transaction device 140 includes at least one media aperture 182, a display 184, and one or more input/output device 186. In some arrangements, the transaction device 140 also includes one or more mounting devices 188.

As shown in FIG. 4A, the transaction device 140 includes a media aperture 182. In some arrangements, the transaction device 140 may include more than one media aperture 182. In these arrangements, each media aperture 182 may be structured to receive and/or dispense a type of transaction media (e.g., banknotes, coins, checks). In some arrangements, the media aperture 182 is a media pocket and a user (e.g., customer) can retrieve and/or place transaction media from/in the media pocket. In some arrangements, the media aperture 182 is operable between an open position and a closed position. For example, the media aperture 182 may be operable to the open position when receiving or dispensing transaction media and operable to the closed position when the transaction device is inactive.

The display 184 is a display output structured to display a user interface. The user interface (UI) may include a transactional UI structured to facilitate a transaction. The transactional UI may be displayed during transaction operations performed by the transaction device. The UI may also include a service mode UI structured to facilitate a service operation. The service mode UI may be displayed responsive to the transaction device computing system 150 executing the service mode executable 172. The service mode UI, described in detail herein below, may include any number of interactive elements or icons for facilitating the service operation.

The I/O devices 186 may include at least one I/O device for facilitating an operation (e.g., a transactional operation and/or a service mode operation) at the transaction device 140. In some arrangements, the I/O devices 186 include a card reader structured to receive an input from a transaction card (e.g., an ATM card, a credit card, a debit card, a gift card) and/or a security card (e.g., an identification card). The input may include a RFID signal, a magnetic strip, a security chip, and/or any other input signal. In some arrangements, the I/O devices 186 may include a keypad, keyboard, touchscreen keyboard, or other typing device structured to receive a user input including an alphanumeric input, or other touch input. In some arrangements, the I/O devices 186 includes a biometric sensor structured to receive a biometric from a user such as a fingerprint scan, an eye scan, a face scan and the like.

The one or more mounting devices 188 may include any combination of fasteners, pins, magnets, snap fit devices, holes, and/or receptacles for coupling the transaction device 140 to the adapter housing 202. In some arrangements, when the adapter housing 202 is coupled to the transaction device via the mounting devices 188, the adapter housing 202 is substantially aligned with the media aperture 182 such that the adapter housing 202 can facilitate transferring banknotes to/from the transaction device 140 via the media aperture 182.

FIG. 4B is an internal view of the transaction device 140 of FIG. 2, according to an example arrangement. As shown the vault 192 includes a storage cassette housing 194 having one or more cassette slots 198. In some arrangements, the transaction device transport apparatus 190 is coupled to the storage cassette housing 194 and/or each of the one or more cassette slots 198. In some arrangements, the cassette slots 198 are structured to receive a storage cassette. In some arrangements, the transaction device 140 may access the storage cassettes in the cassette slots 198. For example, the transaction device 140 may retrievably store transaction media in the storage cassettes and transport the transaction media to/from the storage cassettes via the transport apparatus 190. In some arrangements, the transaction device 140 may define a maximum and/or minimum storage parameter based on the number of storage cassettes docked in the cassette slots 198. For example, the transaction device 140 may define a maximum storage parameter based on the maximum number of banknotes that can be stored in the docked storage cassettes. The transaction device may also define a minimum parameter (i.e., minimum threshold) for a number of banknotes required to facilitate transaction operations based at least partially on the number of storage cassettes docked in the storage cassette housing 194. In some arrangements, the vault 192 at least partially defines an area 196. In some arrangements, and as shown in FIG. 4B, the area 196 is at least partially defined by the storage cassette housing 194.

Figure 5A:
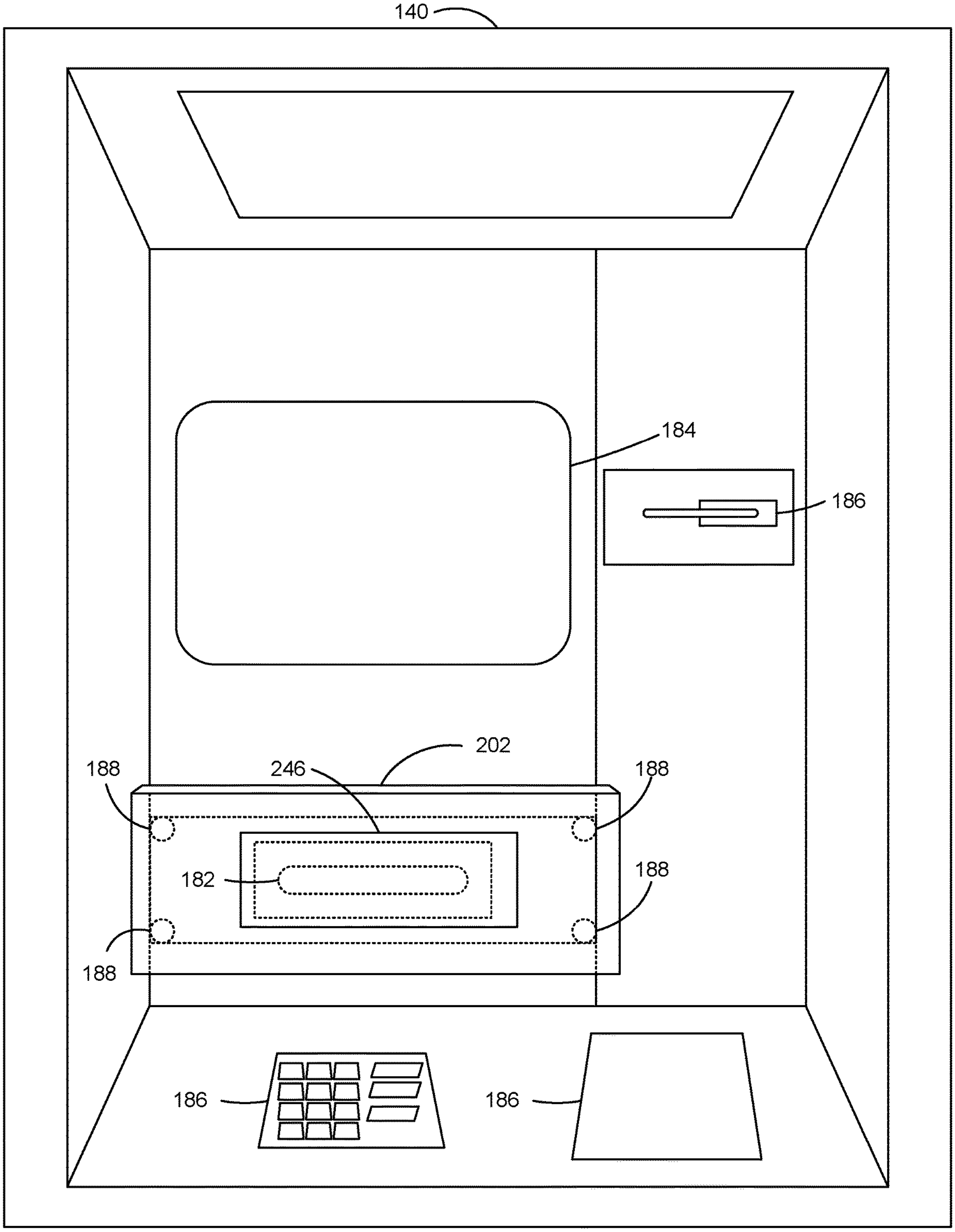
FIG. 5A is a front elevated view of the transaction device of FIG. 2 and the adapter housing of FIG. 3A, according to an example arrangement.

FIG. 5A is a front elevated view of the transaction device 140 of FIG. 2 and the adapter housing 202 of FIG. 3A, according to an example arrangement. As shown in FIG. 5A, the adapter housing 202 is coupled to the front, user facing side of the transaction device 140. In some arrangements, the adapter housing 202 couples to the one or more mounting devices 188. In some arrangements, and as shown in FIG. 5A, the adapter housing 202 is substantially aligned with the media aperture 182. In some arrangements, and as shown in FIG. 5A, the transfer cassette interface 246 faces outwardly from the transaction device 140 when the adapter housing 202 is installed on the transaction device 140. In some arrangements, a user (e.g., a provider employee) may install or remove a transfer cassette while the adapter housing 202 is installed on the transaction device 140.

Figure 5B:
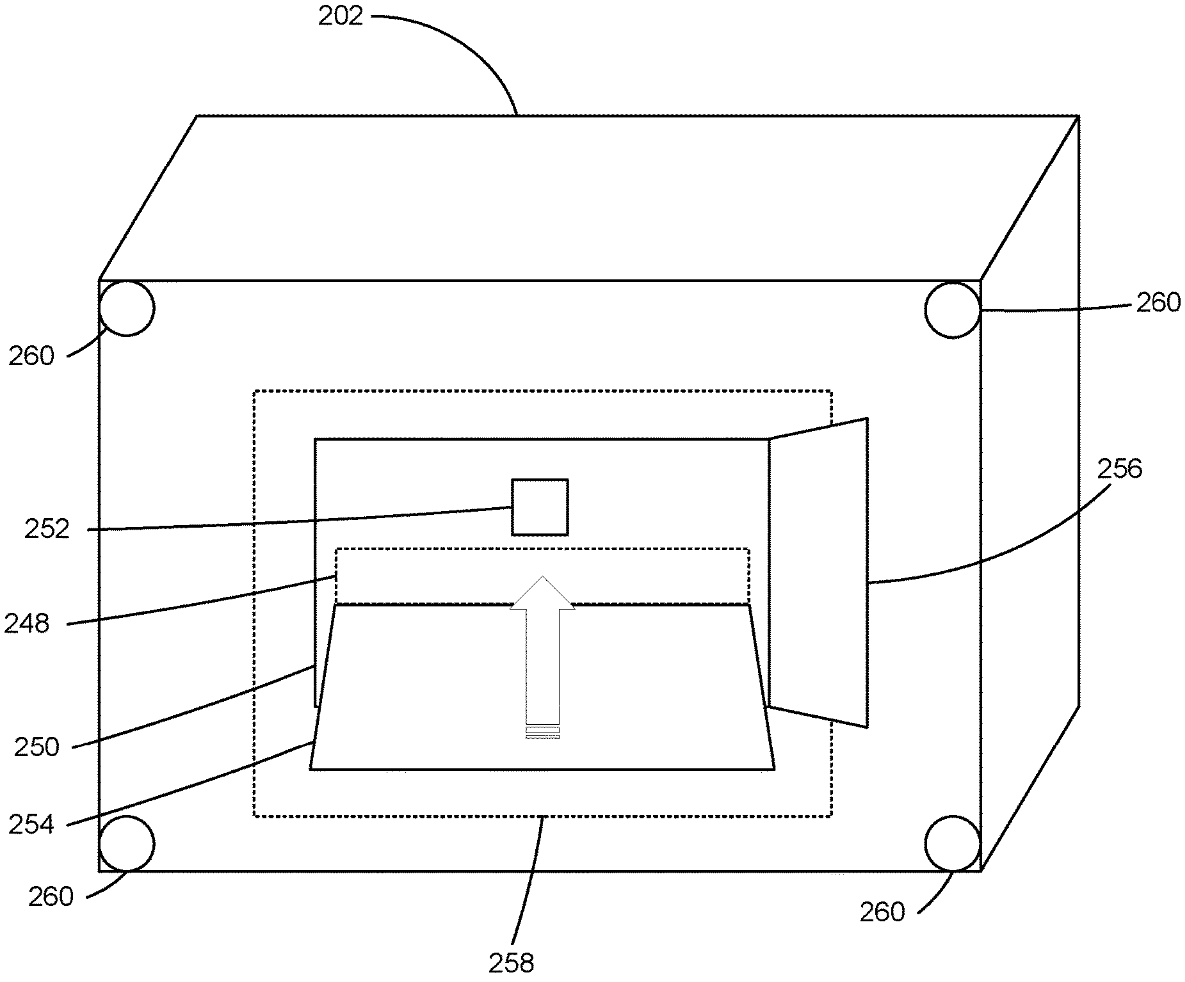
FIG. 5B is a detailed rear view of the adapter housing of FIG. 3A, according to an example arrangement.

FIG. 5B is a detailed rear view of the adapter housing 202 of FIG. 3A, according to an example arrangement. In some arrangements, and as shown in FIG. 5B, the adapter housing 202 includes a transport apparatus 248, a transaction device interface 250, a sensor 252, a transfer arm 254, a portal 256, a security skirt 258, and one or more mounting device 260. As described above, the transport apparatus 248 is structured to facilitate transporting transaction media (e.g., to/from the transfer cassette 108 and the transaction device 140). The transaction device interface 250 is structured to facilitate interfacing with the transaction device 140. The sensor 252 is structured to detect one or more parameters of a service operation, transaction media entering or exiting the adapter housing 202, and/or any other parameter near the transaction device interface 250. The transport arm 254 is structured to at least partially extend out of the adapter housing 202 when in an extended position (as shown). As described above, the transport arm may, at least partially, extend into a portion of the transaction device 140 such as the media aperture 182.

The portal 256 is a door that is operable between an open position and a closed position. In the closed positon, the portal 256 substantially prevents or mitigates against a user from reaching into the adapter housing 202. In the open position the portal 265 defines an opening that allows the transfer arm 254 to extend out of the adapter housing 202. In some arrangements the portal 256 is one of a hinged door, a sliding door, or other openable portal. In some arrangements, the portal 256 is operable by the housing control computing system 210. For example, the housing control computing system 210 may receive a first signal from one or more sensors (e.g., sensor 252) indicating that the adapter housing 202 is coupled to the transaction device 140. Responsive to receiving the first signal, the housing control computing system 210 may operate the portal 256 from the closed position to the open position. In some arrangements, the housing control computing system 210 may operate the portal 256 from the open position to the closed position based on a second signal indicating at least one of a sensor detection of a foreign object between the adapter housing 202 and the transaction device 140, a sensor detection that the security skirt 258 is not in an extended position, an indication that the service operation is completed, and/or other parameter related to the service operation.

The security skirt 258 is a skirt that extend around a periphery of the opening defined by the portal 256. In some arrangements, the security skirt is operable between a first position and a second position. The first position may be a retracted position. In the first position the security skirt 258 may be substantially flush with an external surface of the adapter housing 202. In the second position, the security skirt 258 may be extended away from the outer surface of the adapter housing 202. In some arrangements, the security skirt 258 is structured to operate from the first position to the second position responsive to the adapter housing 202 being coupled to the transaction device 140. In some arrangements, the security skirt 258 is structured to contact an outer surface of the transaction device 140 in the second position such that a user is substantially prevented from reaching between the transaction device 140 and the adapter housing 202. In some arrangements, the sensor 252 may detect whether the security skirt 258 is in the second position. In some arrangements, the portal 256 may remain in the closed position until the security skirt is in the second position.

In some arrangements, the security skirt 258 is operable by the housing control computing system 210. For example, the housing control computing system 210 may receive a first signal from one or more sensors (e.g., sensor 252) indicating that the adapter housing 202 is coupled to the transaction device 140. Responsive to receiving the first signal, the housing control computing system 210 may operate the security skirt 258 from the first position to the second position. In some arrangements, the housing control computing system 210 may operate the security skirt 258 from the second position to the first position based on a second signal indicating at least one of a sensor detection of a foreign object between the adapter housing 202 and the transaction device 140, a sensor detection that the portal 256 is in the closed position, an indication that the service operation is completed, and/or other parameter related to the service operation.

As shown in FIG. 5B, the adapter housing 202 includes one or more mounting device 260 structured to interface with the mounting devices 188 of the transaction device 140. In some arrangements, the mounting device 260 include a complementary mounting device (e.g., bolt, fastener, screw, hole, receptacle, magnet, snap-fit arrangement, and so on) such that the mounting devices 188 of the transaction device 140 and the mounting device 260 of the adapter housing 202 facilitate coupling the adapter housing 202 to the transaction device 140.

Figure 5C:
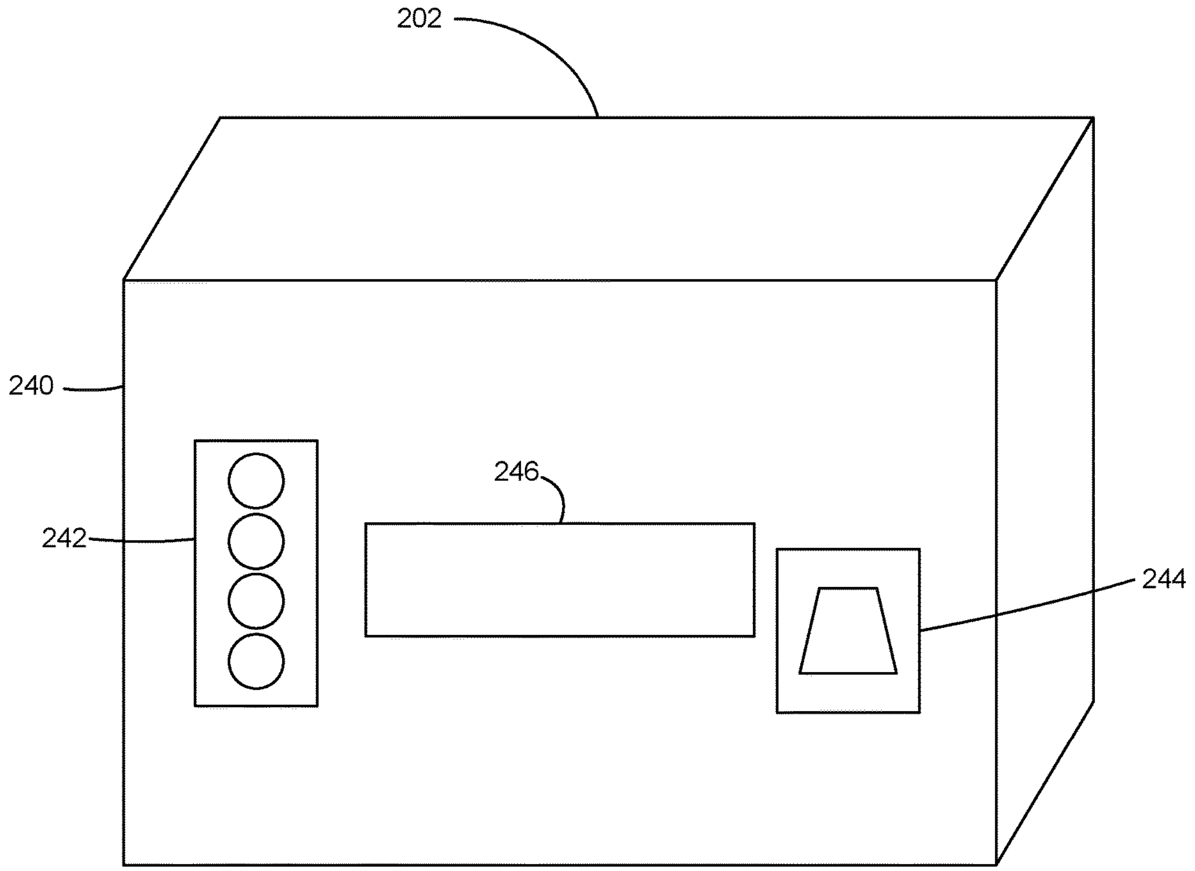
FIG. 5C is a detailed front view of the adapter housing of FIG. 3A, according to an example arrangement.

FIG. 5C is a detailed front view of the adapter housing 202 of FIG. 3A, according to an example arrangement. As shown, the adapter housing 202 includes a user interface apparatus 240 which includes one or more I/O device 242 and a security device 244. In some arrangements, the I/O device 242 is communicatively coupled to the housing control computing system 210 may such that the I/O device 242 may receive user input and/or provide an output to a user. In some arrangements, and as shown in FIG. 5C, the I/O device 242 may include one or more status indication lights structured to indicate an operational status of the adapter housing 202 and/or an status of a service operation. For example the I/O device 242 may indicate whether a transfer cassette 108 is installed in the adapter housing 202, whether the adapter housing 202 is installed on a transaction device 140, whether the correct transfer cassette 108 is installed in the adapter housing 202, whether the adapter housing 202 is installed on a correct transaction device 140, whether a service operation has started, whether a service operation has been completed, and/or any other parameter.

In some arrangements, the adapter housing 202 also includes the transfer cassette interface 246 on a front side. In some arrangements, the transfer cassette interface 246 defines a receptacle or slot structured to receive one or more of the transfer cassettes 108. In some arrangements, the transfer cassette interface 246 includes a lock operable between an unlocked state and a locked state structured to prevent an unauthorized user from inserting and/or removing a transfer cassette 108 from the slot. In some arrangements the lock is operable by housing control computing system 210. For example, the housing control computing system 210 may receive a security token from the security device 244 and set the lock to the unlocked state. In some arrangements, the housing control computing system 210 may automatically set the lock to the locked state (e.g., after a predetermined amount of time, after receiving a sensor indication that a transfer cassette 108 has been docked or removed). In some arrangements, the housing control computing system 210 may set the lock to the locked state after receiving an additional or subsequent security token via the security device 244.

Figure 5D:
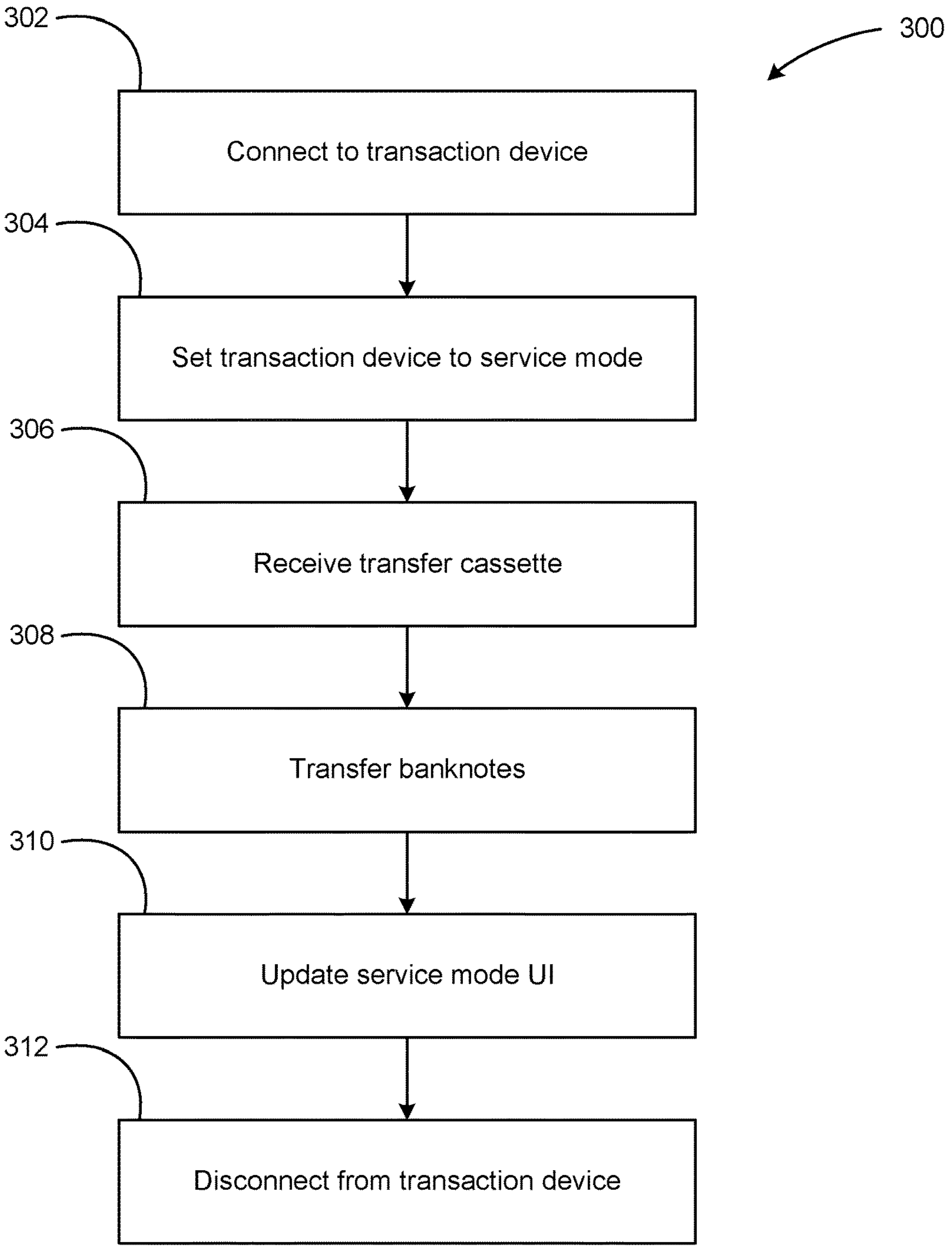
FIG. 5D is a flow diagram of a method of facilitating a service operation with the adapter housing of FIG. 3A, according to an example arrangement.

FIG. 5D is a flow diagram of a method 300 of facilitating a service operation with the adapter housing 202 of FIG. 3A, according to an example arrangement. In some arrangements, one or more of the computing systems of the system 100 may be configured to perform method 300. For example, the provider computing system 110, the transaction device computing system 150, and/or the housing control computing system 210, may be structured to perform the method 300. In some arrangements, one or more of the transaction device 140 and the adapter housing 202 may be configured to perform the method 300. In an example arrangement, the transaction device 140 and transaction device computing system 150 may, alone or in combination with other devices such as the adapter housing 202 and the housing control computing system 210, and/or the provider computing system 110 may perform the method 300. In an example arrangement, the method 300 is performed by the adapter housing 202 in combination with the transaction device 140. In some arrangements, the method 300 may include user inputs from a user (e.g., a provider employee) one or more user devices (such as devices of provider employees), another computing device on the network 105, and the like.

In broad overview of method 300, at step 302, the adapter housing 202 connects to the transaction device 140. At step 304, the transaction device 140 is set to service mode. At step 306, the adapter housing 202 receives a transfer cassette 108. At step 308, the adapter housing 202 facilitates transferring banknotes between the transfer cassette and the transaction device 140. At step 310, the transaction device 140 updates the service mode user interface (e.g., the UI 400 of FIG. 8). At step 312, the adapter housing 202 is disconnected from the transaction device 140. In some arrangements, the steps of the method 300 may be performed in a different order than as shown in FIG. 5D. For example, step 306 may be performed before step 302. In some arrangements, the method 300 may include more or fewer steps than as shown in FIG. 5D.

Referring to the method 300 in more detail, at step 302, the adapter housing 202 is connected to the transaction device 140. In some arrangements, the connection includes a physical connection where the mounting device 188, 260 facilitate coupling the adapter housing 202 to the transaction device 140. In some arrangements, the connection includes communicatively coupling the transaction device computing system 150 and the housing control computing system 210. In some arrangements, communication is established via a wired or wireless connection (e.g., via the network 105).

In some arrangements, step 302 includes checking if the adapter housing 202 is coupled to the correct transaction device 140. For example, the provider computing system 110 may identify a first transaction device of a plurality of transaction device 140 that needs a service operation (e.g., based on one or more of a fill level of the storage cassettes of the transaction device 140, an anticipated requirement for the fill level, a fill level of nearby transaction device and/or other parameters of the transaction device 140). The provider computing system 110 may provide an indication to the transaction device computing system 150 and/or the service device computing system 210 indicating a first adapter housing of a plurality of adapter housings 202 to couple to the first transaction device. Accordingly, when the adapter housing 202 is connected to the transaction device 140, one or more of the provider computing system 110, the transaction device computing system 150, and the housing control computing system 210 may verify that the correct adapter housing 202 is connected to the correct transaction device 140. In some arrangements, the housing control computing system 210 may be structured to provide an indication to a user (e.g., via the I/O devices 242) that indicates whether the correct adapter housing 202 is coupled to the correct transaction device 140.

At step 304, the transaction device 140 is set to a service mode. In some arrangements, the transaction device computing system 150 executes or is caused to execute a service mode executable 172, 232. In some arrangements, the service mode executable 172, 232 is executed responsive to detecting, by one or more sensors (e.g., sensor 252), that the adapter housing 202 is connected to the transaction device 140. In some arrangements, service mode executable 172, 232 is executed responsive to receiving a security token from one or more of the security device 244 and one or more of the I/O devices 186. In some arrangements, the service mode includes displaying, by the display 184 a service mode UI (e.g., the service mode UI 400 of FIG. 8). While the transaction device 140 is set to the service mode, the transaction device 140 is structured to facilitate performing the service operation of the method 300.

At step 306, the adapter housing 202 receives a transfer cassette 108. As described above, the transfer cassette 108 may dock with the adapter housing 202 at the transfer cassette interface 246. In some arrangements, the adapter housing 202 may receive more than one transfer cassette 108. In some arrangements, the adapter housing 202 may be configured to receive more than one transfer cassette 108 simultaneously. In some arrangements, the adapter housing 202 may be configured to receive the transfer cassettes 108 sequentially. For example, the service operation may be at least partially completed when a first transfer cassette 108 is docked and removed, and the service operation may be partially completed when a second transfer cassette 108 is docked and removed. The transfer cassettes 108 may be docked and/or removed repeatedly until the service operation is completed.

At step 308, the adapter housing 202 initiates the transfer of transaction media including banknotes. As described above, in some arrangements, the adapter housing 202 may transfer banknotes from the docked transfer cassette 108 to the transaction device 140 via the media aperture 182. In some arrangements, the adapter housing may transfer banknotes from the media aperture 182 to the docked transfer cassette 108. In some arrangements, the housing control computing system 110 causes the transport apparatus 248 to facilitate moving the banknotes to/from the transfer cassette 108. In some arrangements, the banknotes are transferred based on a predetermined service operation parameter. For example, the provider computing system 110 may determine a number of banknotes to transfer based on at least one of a fill level of the storage cassettes of the transaction device 140, a denomination of the banknotes in the transfer cassette and/or in the storage cassettes, a minimum storage threshold for the transaction device, and a maximum storage threshold for the transaction device.

At step 310, the service mode UI 400 is updated. In some arrangements, when one or more of the provider computing system 110, the transaction device computing system 150, the housing control computing system 210 receives data that includes an indication that at least a portion of the service operation is completed, the transaction device computing system 150 is structured to modify and/or update the service mode UI 400 with the data. For example, the transaction device computing system 150 may update the service mode UI 400 when the adapter housing 202 is coupled to the transaction device 140, when the transfer cassette 108 is coupled to the adapter housing 202, when a first set of banknotes has been transferred, when all banknotes of the service operation have been transferred, and/or when the adapter housing 202 is removed from the transaction device 140.

At step 312, the adapter housing 202 is disconnected from the transaction device 140. In some arrangements, the adapter housing 202 may provide an indication (e.g., via the I/O devices 244) that the service operation is completed. In these arrangements, a user may remove or decouple the adapter housing form the transaction device1 140.

Figure 6A:
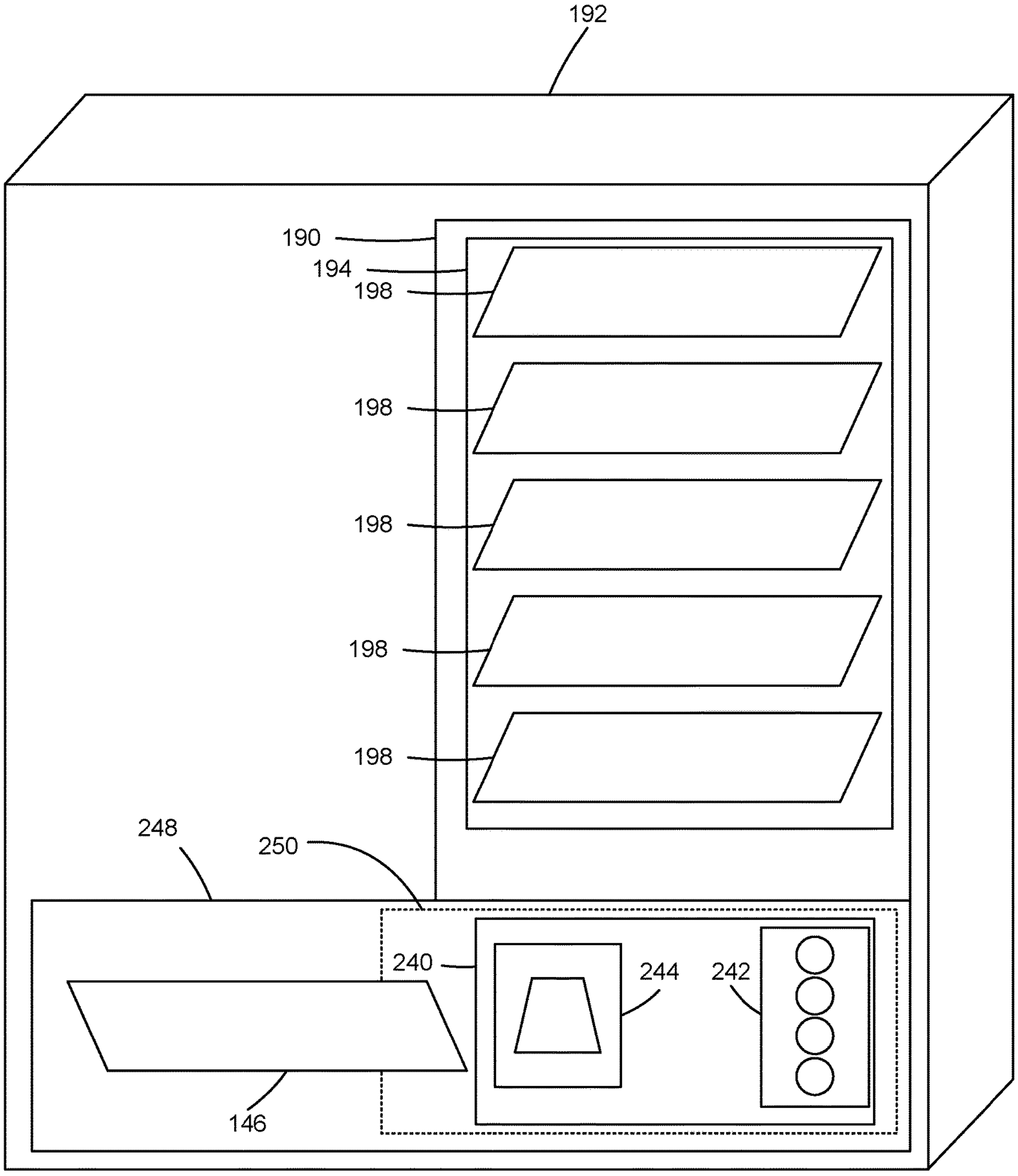
FIG. 6A is an internal view of the transaction device of FIG. 2 and the retrofit housing of FIG. 3B, according to an example arrangement.

FIG. 6A is an internal view of the transaction device 140 of FIG. 2 and the retrofit housing 204 of FIG. 3B, according to an example arrangement. The retrofit housing 204 includes a transfer cassette interface 146, a transport apparatus 248, a transaction device interface 250 and a user interface apparatus 240. The components of the retrofit housing are described in detail above with respect to FIG. 3B.

As shown in FIG. 6A, the retrofit housing 204 is coupled at least partially to the transport apparatus 190. In some arrangements the retrofit housing 204 is at least partially coupled to the storage cassette housing 194. In some arrangements, the transport apparatus 190 is modified to receive the transaction device interface 250 and couple to the transport apparatus 248 such that the transport apparatus 248 is operable to transport banknotes from the transfer cassette 108 to the transaction device via the transport apparatus 190 and vice versa.

Figure 6B:
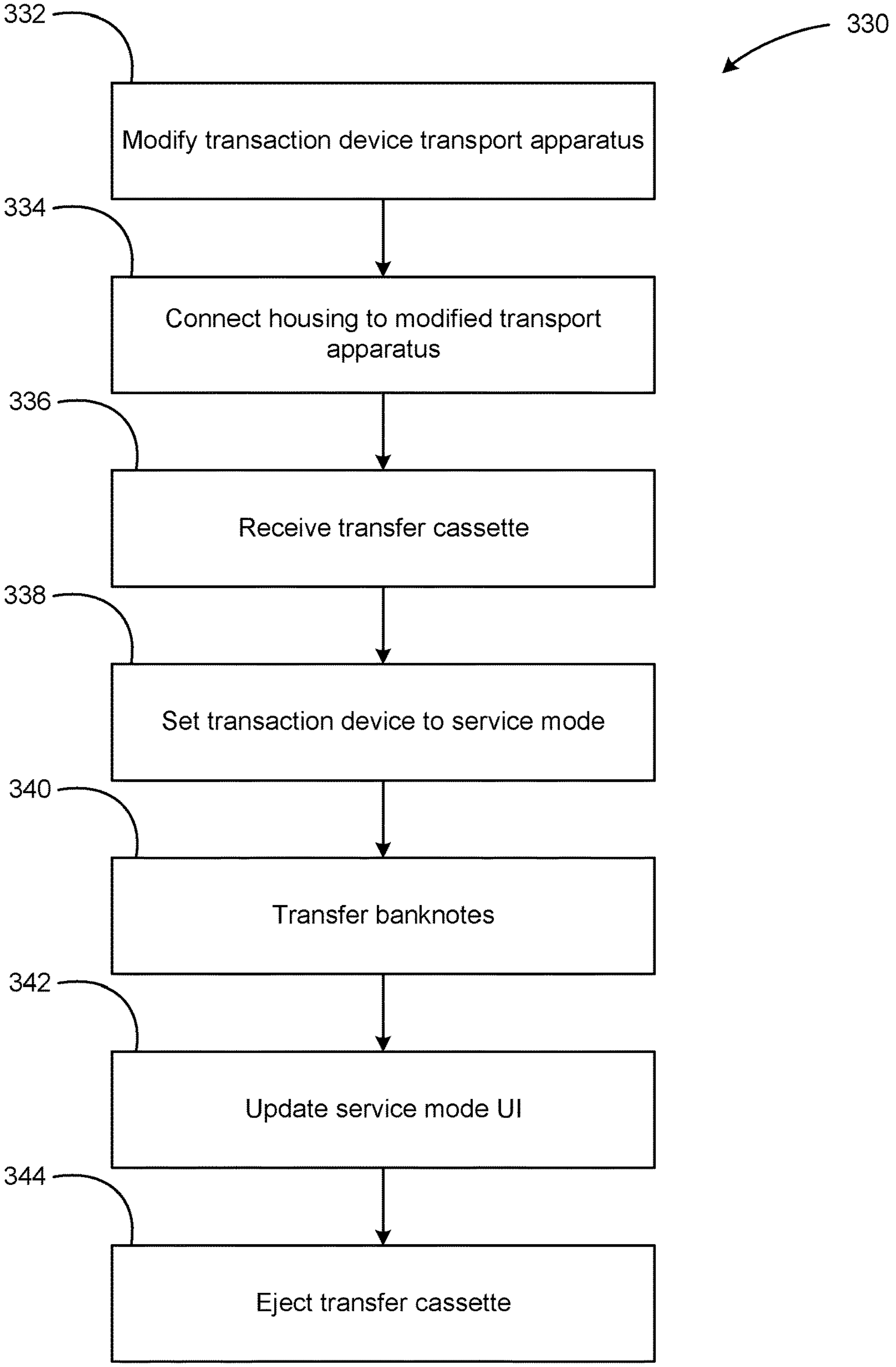
FIG. 6B is a flow diagram of a method of facilitating a service operation with the retrofit housing of FIG. 3B, according to an example arrangement.

FIG. 6B is a flow diagram of a method 330 of facilitating a service operation with the retrofit housing 204 of FIG. 3B, according to an example arrangement. In some arrangements, one or more of the computing systems of the system 100 may be configured to perform method 330. For example, the provider computing system 110, the transaction device computing system 150, and/or the housing control computing system 210, may be structured to perform the method 330. In some arrangements, one or more of the transaction device 140 and the retrofit housing 204 may be configured to perform the method 330. In an example arrangement, the transaction device 140 and transaction device computing system 150 may, alone or in combination with other devices such as the adapter housing 202 and the housing control computing system 210, and/or the provider computing system 110 may perform the method 330. In an example arrangement, the method 330 is performed by the retrofit housing 204 in combination with the transaction device 140. In some arrangements, the method 330 may include user inputs from a user (e.g., a provider employee) one or more user devices (such as devices of provider employees), another computing device on the network 105, and the like.

In broad overview of method 330, at step 332, the transaction device transport apparatus 190 is modified. At step 334, the retrofit housing 204 is connected to the modified transport apparatus 190. At step 336, the retrofit housing 204 receives a transfer cassette 108. At step 338, the transaction device 140 is set to a service mode. At step 340, transaction media include banknotes is transferred between the transfer cassette 108 and the transaction device 140. At step 342, service mode UI is updated. At step 244 the transfer cassette is ejected. In some arrangements, the steps of the method 330 may be performed in a different order than as shown in FIG. 6B. In some arrangements, the method 330 may include more or fewer steps than as shown in FIG. 6B.

Referring to the method 330 in more detail, at step 332, the transaction device transport apparatus 190 is modified. In some arrangements, the modification includes structuring the transport apparatus 190 to receive the transaction device interface 250.

At step 334 the retrofit housing 204 is connected to the transaction device 140 via the modified transport apparatus 190. In some arrangements the transaction device interface 250 is coupled to the transport apparatus 190 such that the transport apparatus 248 may facilitate transferring banknotes from a docked transfer cassette 108 to the transaction device 140 via the modified transport apparatus 190.

At step 336 the retrofit housing 204 receives a transfer cassette 108. As described above, the transfer cassette 108 may dock with the retrofit housing 204 at the transfer cassette interface 246. In some arrangements, the retrofit housing 204 may receive more than one transfer cassette 108. In some arrangements, the retrofit housing 204 may be configured to receive more than one transfer cassette 108 simultaneously. In some arrangements, the retrofit housing 204 may be configured to receive the transfer cassettes 108 sequentially. For example, the service operation may be at least partially completed when a first transfer cassette 108 is docked and removed, and the service operation may be partially completed when a second transfer cassette 108 is docked and removed. The transfer cassettes 108 may be docked and/or removed repeatedly until the service operation is completed.

At step 338, the transaction device 140 is set to a service mode. In some arrangements, the transaction device computing system 150 executes or is caused to execute a service mode executable 172, 232. In some arrangements, the service mode executable 172, 232 is executed responsive to detecting, by one or more sensors (e.g., sensor 252), that the retrofit housing 204 is connected to the transaction device 140. In some arrangements, service mode executable 172, 232 is executed responsive to receiving a security token from one or more of the security device 244 and one or more of the I/O devices 186. In some arrangements, the service mode includes displaying, by the display 184 a service mode UI (e.g., the service mode UI 400 of FIG. 8). While the transaction device 140 is set to the service mode, the transaction device 140 is structured to facilitate performing the service operation of the method 330.

At step 340, the retrofit housing 204 initiates the transfer of transaction media including banknotes. As described above, in some arrangements, the retrofit housing 204 may transfer banknotes from the docked transfer cassette 108 to the transaction device 140 via the modified transport apparatus 190. In some arrangements, the retrofit housing 204 may transfer banknotes from the transport apparatus 190 to the docked transfer cassette 108. In some arrangements, the housing control computing system 110 causes the transport apparatus 248 to facilitate moving the banknotes to/from the transfer cassette 108. In some arrangements, the banknotes are transferred based on a predetermined service operation parameter. For example, the provider computing system 110 may determine a number of banknotes to transfer based on at least one of a fill level of the storage cassettes of the transaction device 140, a denomination of the banknotes in the transfer cassette and/or in the storage cassettes, a minimum storage threshold for the transaction device, and a maximum storage threshold for the transaction device.

At step 342, the service mode UI 400 is updated. In some arrangements, when one or more of the provider computing system 110, the transaction device computing system 150, the housing control computing system 210 receives data that includes an indication that at least a portion of the service operation is completed, the transaction device computing system 150 is structured to modify and/or update the service mode UI 400 with the data. For example, the transaction device computing system 150 may update the service mode UI 400 when a transfer cassette 108 is coupled to the transaction device 140, when a first set of banknotes has been transferred, when all banknotes of the service operation have been transferred, and/or when the transfer cassette 108 is removed from the retrofit housing 204.

At step 344, the transfer cassette 108 is ejected or disconnected from the retrofit housing 204. In some arrangements, the retrofit housing 204 may provide an indication (e.g., via the I/O devices 244) that the service operation is completed. In these arrangements, a user may remove or decouple the transfer cassette 108 form the retrofit housing 204.

Figure 7A:
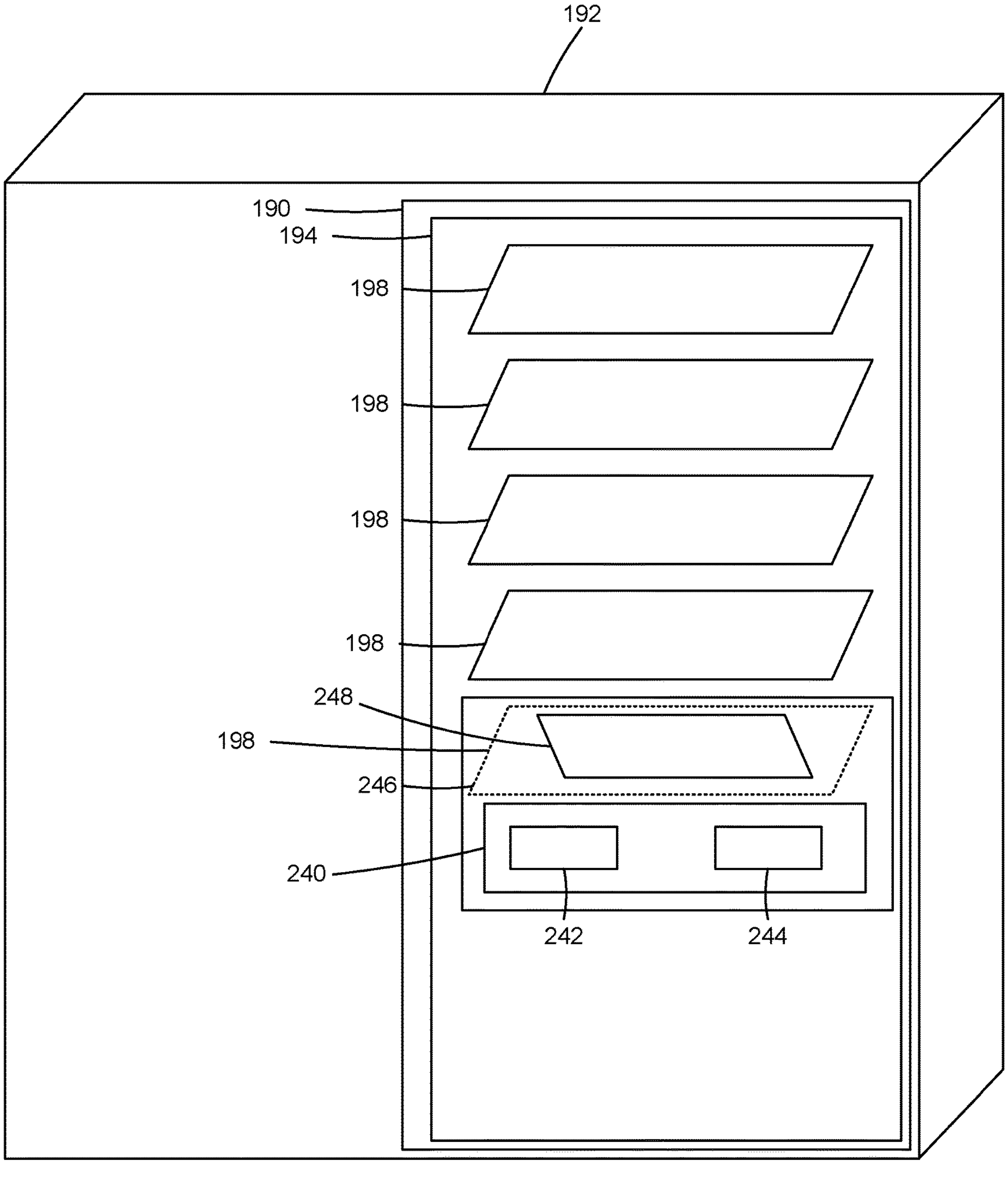
FIG. 7A is an internal view of the transaction device of FIG. 2 and the internal adapter housing of FIG. 3C, according to an example arrangement.

FIG. 7A is an internal view of the transaction device 140 of FIG. 2 and the internal adapter housing 206 of FIG. 3C, according to an example arrangement. The internal adapter housing 206 includes a transfer cassette interface 146, a transaction device interface 250 and a user interface apparatus 240. The components of the internal adapter housing 206 are described in detail above with respect to FIG. 3C.

As shown in FIG. 7A, the internal adapter housing 206 is coupled at least partially to the storage cassette housing 194. In some arrangements, the internal adapter housing 206 is docked with one of the storage cassette slots 198 such that the transaction device interface 250 couples to the transport apparatus transport apparatus 190. In some arrangements, the transport apparatus 248 is operable to transport banknotes from the transfer cassette 108 to the transaction device via the transport apparatus 190 and vice versa.

Figure 7B:
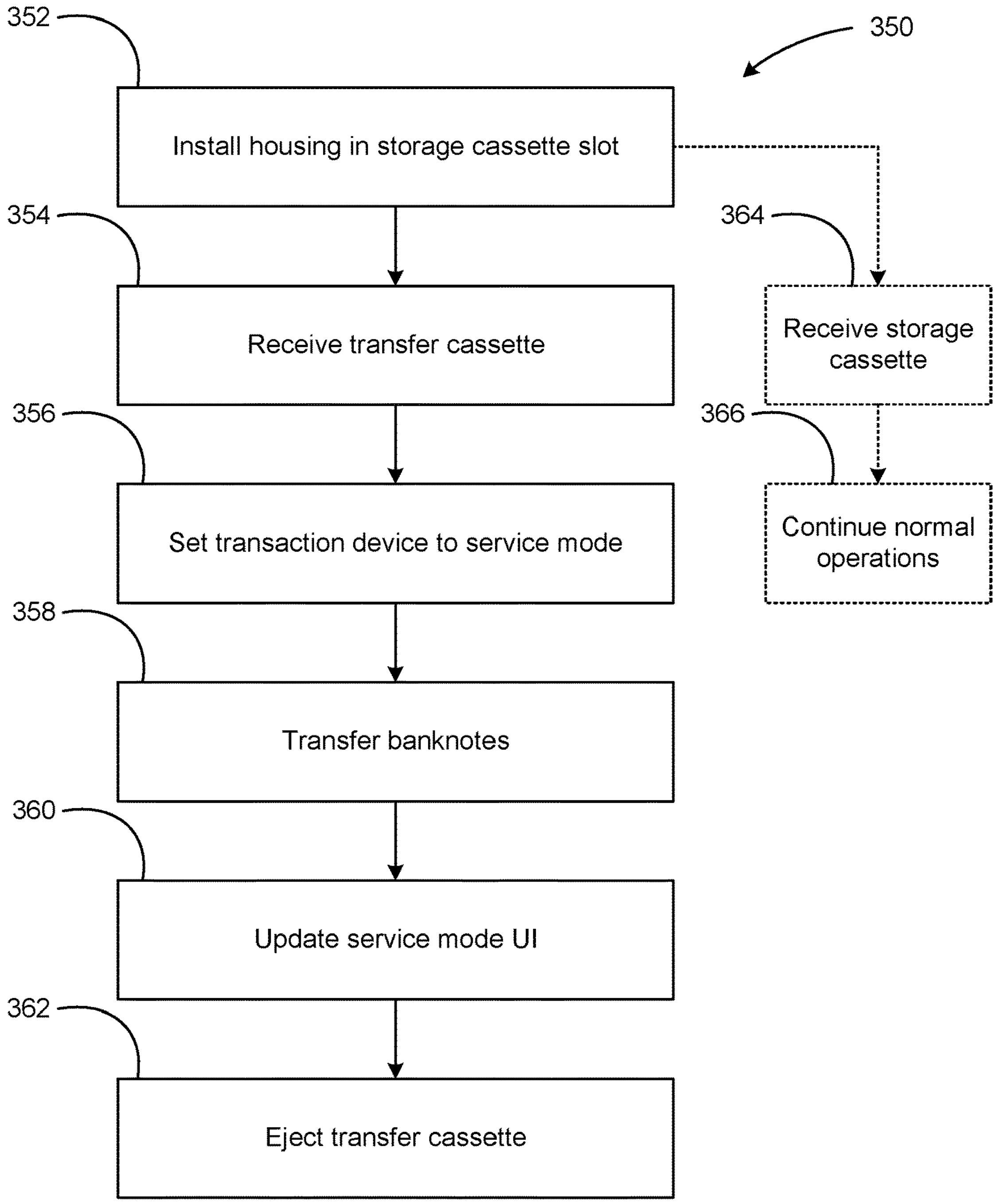
FIG. 7B is a flow diagram of a method of facilitating a service operation with the internal adapter housing of FIG. 3C, according to an example arrangement

FIG. 7B is a flow diagram of a method 350 of facilitating a service operation with the internal adapter housing of FIG. 3C, according to an example arrangement. In some arrangements, one or more of the computing systems of the system 100 may be configured to perform method 350. For example, the provider computing system 110, the transaction device computing system 150, and/or the housing control computing system 210, may be structured to perform the method 350. In some arrangements, one or more of the transaction device 140 and the internal adapter housing 206 may be configured to perform the method 350. In an example arrangement, the transaction device 140 and transaction device computing system 150 may, alone or in combination with other devices such as the internal adapter housing 206 and the housing control computing system 210, and/or the provider computing system 110 may perform the method 350. In an example arrangement, the method 350 is performed by the adapter housing 202 in combination with the transaction device 140. In some arrangements, the method 350 may include user inputs from a user (e.g., a provider employee) one or more user devices (such as devices of provider employees), another computing device on the network 105, and the like.

In broad overview of method 350, at step 352, the internal adapter housing 206 connects to the transaction device 140 at a storage cassette slot 198. At step 354, the internal adapter housing 206 receives a transfer cassette 108. At step 356, the transaction device 140 is set to service mode. At step 358, the internal adapter housing 206 facilitates transferring banknotes between the transfer cassette and the transaction device 140. At step 360, the transaction device 140 updates the service mode user interface (e.g., the UI 400 of FIG. 8). At step 362, the transfer cassette 108 is removed or ejected from the internal adapter housing 206. In some arrangements, the steps of the method 350 may be performed in a different order than as shown in FIG. 5D. In some arrangements, the method 300 may include more or fewer steps than as shown in FIG. 5D. For example, the method 350 may include steps 364 and 366. At step 364 the internal adapter housing 206 receives a storage cassette at the transfer cassette interface 248. At step 366, the transaction device continues normal operations (e.g., transactional operations).

Referring to the method 350 in more detail, at step 352, the internal adapter housing 206 is connected to the transaction device 140. In some arrangements, the internal adapter housing 206 couples to at least one of the storage cassette slots 198 of the transaction device 140. In some arrangements, the connection includes communicatively coupling the transaction device computing system 150 and the housing control computing system 210. In some arrangements, communication is established via a wired or wireless connection (e.g., via the network 105).

In some arrangements, after step 352, the internal adapter housing 206 may receive a transfer cassette 108 or a storage cassette. In some arrangements, if the internal adapter housing 206 receives a transfer cassette 108, the method 350 continues to step 354. In some arrangements, if the internal adapter housing 206 receives a storage cassette, the method 350 continues to step 364.

At step 354, the internal adapter housing 206 receives a transfer cassette 108. As described above, the transfer cassette 108 may dock with the internal adapter housing 206 at the transfer cassette interface 246. In some arrangements, the internal adapter housing 206 may receive more than one transfer cassette 108. In some arrangements, the internal adapter housing 206 may be configured to receive more than one transfer cassette 108 simultaneously. In some arrangements, the internal adapter housing 206 may be configured to receive the transfer cassettes 108 sequentially. For example, the service operation may be at least partially completed when a first transfer cassette 108 is docked and removed, and the service operation may be partially completed when a second transfer cassette 108 is docked and removed. The transfer cassettes 108 may be docked and/or removed repeatedly until the service operation is completed.

At step 356, the transaction device 140 is set to a service mode. In some arrangements, the transaction device computing system 150 executes or is caused to execute a service mode executable 172, 232. In some arrangements, the service mode executable 172, 232 is executed responsive to detecting, by one or more sensors (e.g., sensor 252), that the internal adapter housing 206 is connected to the transaction device 140. In some arrangements, service mode executable 172, 232 is executed responsive to receiving a security token from one or more of the security device 244 and one or more of the I/O devices 186. In some arrangements, the service mode includes displaying, by the display 184 a service mode UI (e.g., the service mode UI 400 of FIG. 8). While the transaction device 140 is set to the service mode, the transaction device 140 is structured to facilitate performing the service operation of the method 350.

At step 358, the internal adapter housing 206 initiates the transfer of transaction media including banknotes. As described above, in some arrangements, the internal adapter housing 206 may facilitate the transfer of banknotes from the docked transfer cassette 108 to the transaction device 140 via the transaction device transport apparatus 190 and/or the storage cassette housing 194. In some arrangements, the internal adapter housing 206 may facilitate coupling the transfer cassette 108 to the transaction device transport apparatus 190 such that the transaction device transport apparatus 190 is operable to transfer banknotes from storage cassettes docked in the storage cassette housing 194 to the docked transfer cassette 108. In some arrangements, the housing control computing system 110 causes the transaction device transport apparatus 190 to facilitate moving the banknotes to/from the transfer cassette 108. In some arrangements, the banknotes are transferred based on a predetermined service operation parameter. For example, the provider computing system 110 may determine a number of banknotes to transfer based on at least one of a fill level of the storage cassettes of the transaction device 140, a denomination of the banknotes in the transfer cassette 108 and/or in the storage cassettes, a minimum storage threshold for the transaction device, and a maximum storage threshold for the transaction device.

At step 360, the service mode UI 400 is updated. In some arrangements, when one or more of the provider computing system 110, the transaction device computing system 150, the housing control computing system 210 receives data that includes an indication that at least a portion of the service operation is completed, the transaction device computing system 150 is structured to modify and/or update the service mode UI 400 with the data. For example, the transaction device computing system 150 may update the service mode UI 400 when internal adapter housing 206 is coupled to the transaction device 140, when the transfer cassette 108 is coupled to the adapter housing 202, when a first set of banknotes has been transferred, when all banknotes of the service operation have been transferred, and/or when the internal adapter housing 206 is removed from the transaction device 140.

At step 362, the transfer cassette 108 is disconnected or ejected from the internal adapter housing 206. In some arrangements, the internal adapter housing 206 may provide an indication (e.g., via the I/O devices 244) that the service operation is completed. In these arrangements, a user may remove or decouple the transfer cassette 108 form the internal adapter housing 206.

At step 364, the internal adapter housing 206 receives a storage cassette. In some arrangements, the storage cassette is received by the transfer cassette interface 248. In these arrangements, the transfer cassette interface 248 is structured to receive a storage cassette and facilitate coupling the storage cassette to the transaction device transport apparatus 190.

At step 366, the transaction device 140 continues normal operations. While the storage cassette is docked with the internal adapter housing 206, the transaction device 140 may use the storage cassette as a typical storage cassette.

Figure 8:
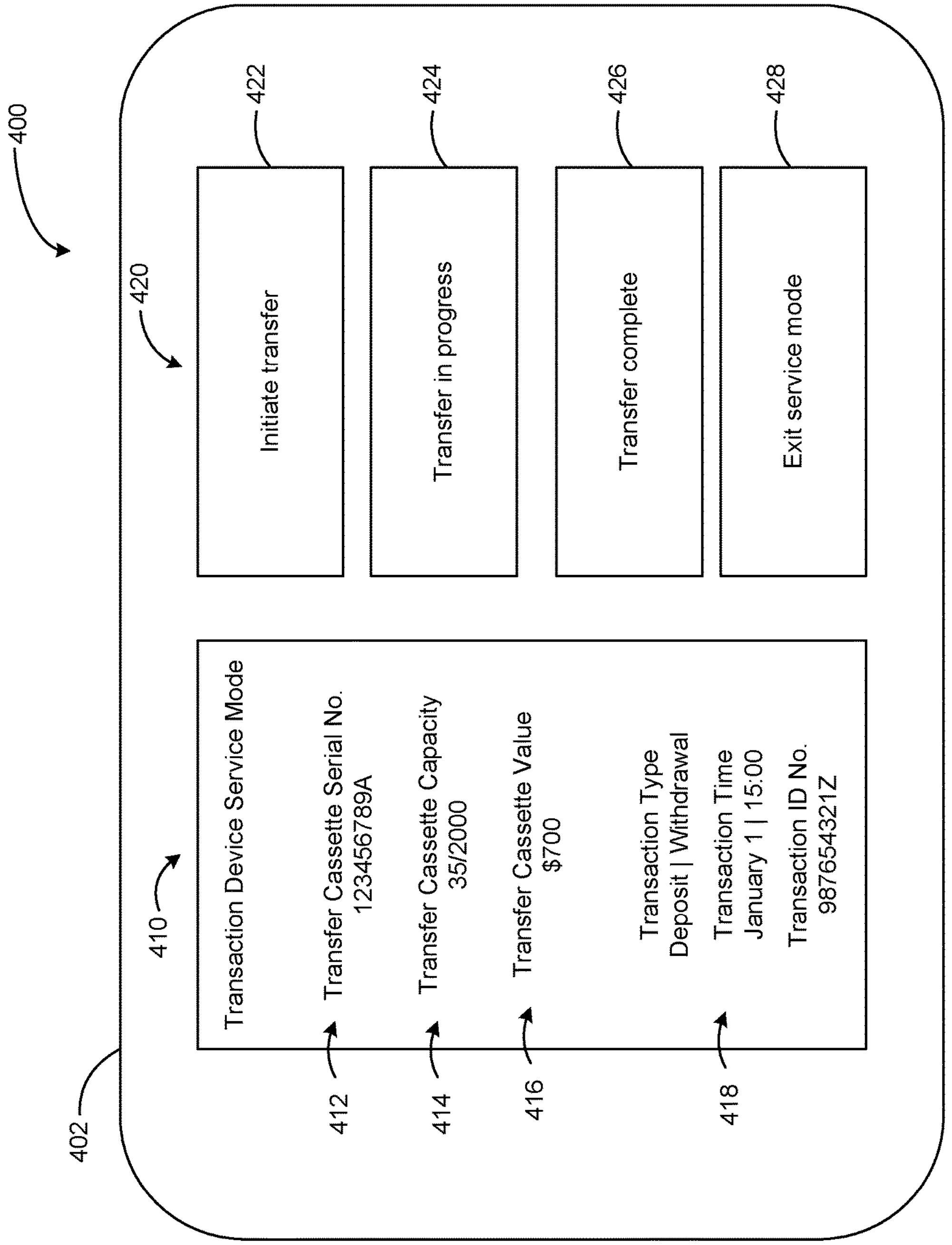
FIG. 8 is an illustration of some aspects of a service user interface showing interactive icons, according to an example arrangement.

FIG. 8 is an illustration of some aspects of a service user interface showing interactive icons, according to an example arrangement. The service mode UI 400 may be provided on a display 402 and include one or more user interface elements such as an information icon 410 and one or more interactive icons 420. In some arrangements, the service mode UI 400 is generated by one or more of the computing systems of the system 100 such as the transaction device computing system 150. In some arrangements, the service mode UI 400 is generated responsive to the transaction device 140 executing the service mode executable 172.

The display 402 may be any display of the system 100. In some arrangements, the display 402 is the display 184 of the transaction device 140. In some arrangements, the display 402 is included in the input/output devices of the housing device 200 (e.g., adapter housing 202, retrofit housing 204, internal adapter housing 206). In some arrangements, the display 402 is a separate display structured to display the service mode UI 400. In these arrangements, the display 402 may be connected to one or more I/O circuits such as the I/O circuit 120, the I/O circuit 160, and/or the I/O circuit 220.

In some arrangements and as shown in FIG. 8, the information icon 410 is structured to display information associated with the service operation described above with respect to the methods 300, 330, 350. For example, the information icon 410 may include one or more operational status and/or any information associated with the service operation. As shown, the information icon 410 may include a serial number 412 of the transfer cassette 108, a capacity or a fill level 414 of the transfer cassette 108, a value of currency 416 stored by the transfer cassette 108, and other transactional information 418 such as a transaction type, a transaction time, a transaction location, and/or a transaction ID number.

In some arrangements and as shown in FIG. 8, the interactive icons 420 are structured to display an operational status associated with the service operation described above with respect to the methods 300, 330, 350. The one or more of the interactive icons 420 may also be structured to receive a user input (e.g., via a touch screen display, a button, I/O device 186, and so on). A first interactive icon 422 may be structured to receive a user input to initiate a transfer of banknotes between the transaction device 140 and the transfer cassette 108. A second interactive icon 424 may be displayed or highlighted responsive a user input being received by the first interactive icon 422. The second interactive icon 424 may indicate that the transfer of banknotes has started. A third interactive icon 426 may be displayed or highlighted responsive to the transfer of banknotes being completed. A fourth interactive icon 428 may be structured to receive a user input and exit the service mode. For example, the fourth interactive icon 428 may provide instructions to the transaction device computing system 150 to end or suspend the service executable 172, responsive to receiving a user input.

In some arrangements, the service mode UI 400 may include additional UI elements. For example, the service mode UI 400 may include a security UI element that prompts a user to provide a security token such as a password, a personal identification number, a biometric, a security chip, an RFID signal, and/or any other security token.

Figure 9:
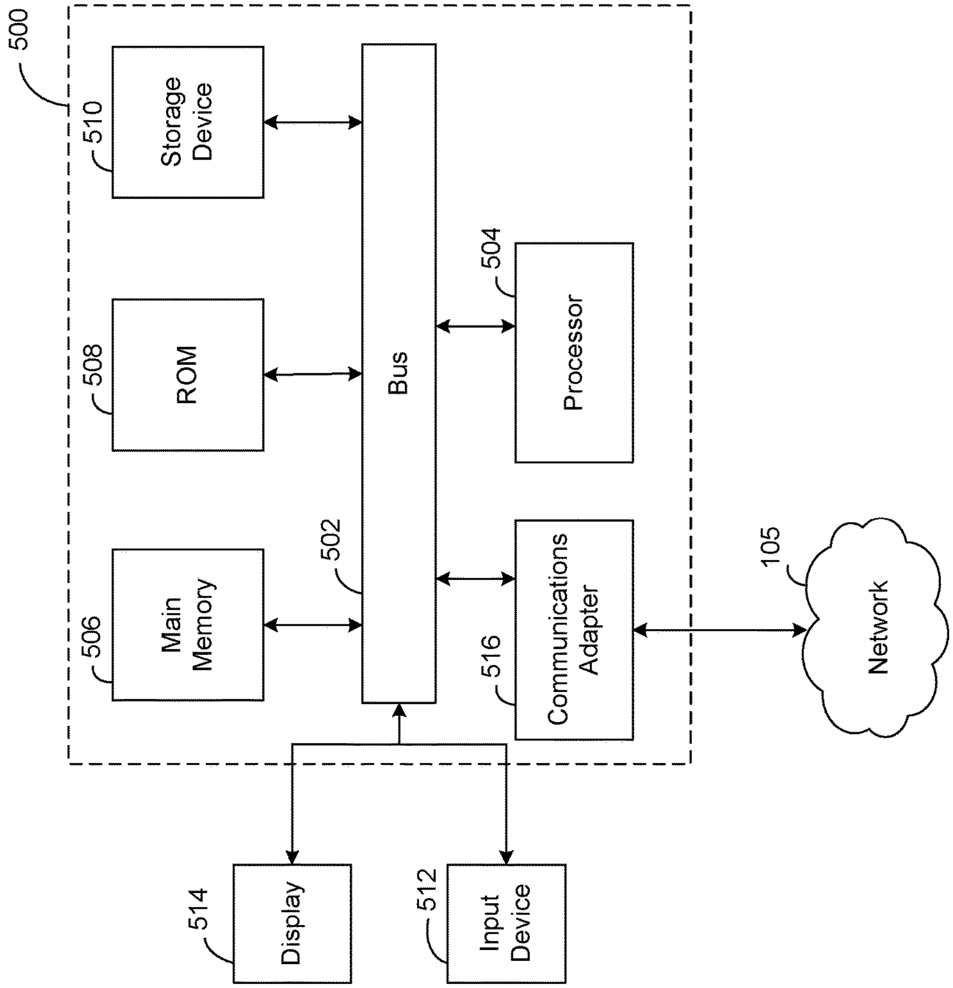
FIG. 9 is a component diagram of an example computing system suitable for use in the various arrangements described herein, according to an example arrangement.

FIG. 9 is a component diagram of an example computing system suitable for use in the various arrangements described herein. For example, the computing system 500 may implement an example FI computing system 110, a transaction device computing system 150, an housing computing system 210, and/or various other example systems and devices described in the present disclosure.

The computing system 500 includes a bus 502 or other communication component for communicating information and a processor 504 coupled to the bus 502 for processing information. The computing system 500 also includes main memory 506, such as a random access memory (RAM) or other dynamic storage device, coupled to the bus 502 for storing information, and instructions to be executed by the processor 504. Main memory 506 can also be used for storing position information, temporary variables, or other intermediate information during execution of instructions by the processor 504. The computing system 500 may further include a read only memory (ROM) 508 or other static storage device coupled to the bus 402 for storing static information and instructions for the processor 504. A storage device 510, such as a solid state device, magnetic disk or optical disk, is coupled to the bus 502 for persistently storing information and instructions.

The computing system 500 may be coupled via the bus 502 to a display 514, such as a liquid crystal display, or active matrix display, for displaying information to a user. An input device 512, such as a keyboard including alphanumeric and other keys, may be coupled to the bus 502 for communicating information, and command selections to the processor 504. In another arrangement, the input device 512 has a touch screen display. The input device 512 can include any type of biometric sensor, a cursor control, such as a mouse, a trackball, or cursor direction keys, for communicating direction information and command selections to the processor 504 and for controlling cursor movement on the display 514.

In some arrangements, the computing system 500 may include a communications adapter 516, such as a networking adapter. Communications adapter 516 may be coupled to bus 502 and may be configured to enable communications with a computing or communications network 105 and/or other computing systems. In various illustrative arrangements, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various arrangements, the processes that effectuate illustrative arrangements that are described herein can be achieved by the computing system 500 in response to the processor 504 executing an arrangement of instructions contained in main memory 506. Such instructions can be read into main memory 506 from another computer-readable medium, such as the storage device 510. Execution of the arrangement of instructions contained in main memory 506 causes the computing system 500 to perform the illustrative processes described herein. One or more processors in a multi-processing arrangement may also be employed to execute the instructions contained in main memory 506. In alternative arrangements, hard-wired circuitry may be used in place of or in combination with software instructions to implement illustrative arrangements. Thus, arrangements are not limited to any specific combination of hardware circuitry and software.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A housing that facilitates a service operation for a transaction device, the housing comprising:

a transfer cassette interface structured to receive a transfer cassette, the transfer cassette structured to retrievably store banknotes;

a media aperture interface structured to removably couple to a media aperture of the transaction device, the media aperture interface coupled to a transfer arm structured to facilitate transferring banknotes to and from the media aperture and the media aperture interface; and a housing transport apparatus structured to facilitate transporting banknotes to and from the transfer cassette via at least one of the transfer cassette interface or the media aperture interface.

2. The housing of claim 1, further comprising at least one fastener structured to removably couple the housing to the transaction device such that the media aperture interface aligns with the media aperture of the transaction device.

3. The housing of claim 2, further comprising a wireless transceiver communicatively coupled to a housing control computing system.

4. The housing of claim 3, wherein the housing control computing system is structured to facilitate the service operation, the service operation comprising:

receiving a first parameter from a first sensor, the first parameter indicating that the housing is coupled to the transaction device;

causing, responsive to receiving the first parameter, the wireless transceiver to communicatively couple the housing control computing system to a transaction device computing system;

providing, responsive to communicatively coupling the housing control computing system to the transaction device computing system, a first indication to the transaction device to execute a service mode executable;

receiving, from the transaction device, a second indication indicating that the transaction device is in a service mode;

causing the media aperture interface to interface with the media aperture of the transaction device; and causing the housing transport apparatus to transport the banknotes between the transfer cassette and the media aperture.

5. The housing of claim 4, wherein the service operation further comprises:

determining that the service operation is completed based on at least one of a user input or a predetermined service operation parameter; and providing, responsive to determining that the service operation is completed, instructions to the transaction device to terminate the service mode executable.

6. The housing of claim 4, wherein the housing further comprises a security device structured to receive a security user input from a user, the security device comprising at least one of a keyboard, a keypad, a biometric sensor, or a touchscreen display.

7. The housing of claim 6, wherein the media aperture interface comprises a door operable between an open position and a closed position; and wherein the service operation further comprises operating the door to the open position responsive to receiving at least one of the first parameter or the security user input.

8. The housing of claim 7, further comprising a skirt extending around a periphery of the door, the skirt operable between a first skirt position and second skirt position, wherein the skirt is substantially flush with an external surface of the housing when the skirt is in the first skirt position, wherein the skirt extends away from the external surface of the housing when the skirt is in the second skirt position.

9. The housing of claim 8, wherein the service operation further comprises operating the skirt from the first skirt position to the second skirt position when the door is in the open position.

10. The housing of claim 1, wherein the media aperture of the transaction device is a media pocket and the transfer arm is structured to extend at least partially into the media pocket to facilitate transferring the banknotes from the media aperture to the housing.

11. A method of facilitating a service operation for a transaction device, the method comprising:

receiving, by a housing, a transfer cassette structured to retrievably store banknotes;

removably coupling the housing to the transaction device proximate a media aperture of the transaction device;

causing a transport arm of the housing to transfer the banknotes to and from the media aperture and a media aperture interface of the housing; and causing a housing transport apparatus to transport the banknotes to and from the transfer cassette via at least one of a transfer cassette interface or the media aperture interface.

12. The method of claim 11, wherein the method further comprises receiving a first user input and a second user input;

wherein at least one of the first user input or the second user input is received via the transaction device; and wherein causing the transport arm to transfer the banknotes between the housing and the media aperture is responsive to receiving the first user input.

13. The method of claim 12, wherein the method further comprises:

communicatively coupling a housing control computing system of the housing to a transaction device computing system of the transaction device responsive to the housing coupling to the transaction device; and providing, by the housing control computing system and responsive to communicatively coupling the housing control computing system to the transaction device computing system, a first indication to the transaction device computing system to initiate a service mode executable.

14. The method of claim 13, further comprising:

determining that the service operation is completed;

providing, responsive to determining that the service operation is complete, a second indication to the transaction device indicating that the service operation is complete; and decoupling the housing and the transaction device;

wherein determining that the service operation is completed is based on at least one of receiving the second user input or a predetermined service operation parameter.

15. The method of claim 13, wherein the method further comprises:

detecting, by a sensor, at least one operational parameter associated with the service operation;

receiving, by the housing control computing system, the at least one operational parameter; and providing the at least one operational parameter to the transaction device computing system.

16. The method of claim 11, further comprising:

causing, responsive to coupling the housing to the transaction device, a door of the housing to operate from a closed position to an open position, the door positioned proximate the media aperture; and causing, responsive to determining that the service operation is complete, the door to operate from the open position to the closed position;

wherein the transport arm automatically extends at least partially out of the housing when the door is in the open position.

17. The method of claim 16, further comprising operating a skirt from a first skirt position to a second skirt position when the door is in the open position, wherein the skirt extends around a periphery of the door.

18. A non-transitory computer readable medium having computer-executable instructions embodied therein that, when executed by one or more processors of a computing system, cause the computing system to perform operations to facilitate servicing a transaction device, the operations comprising:

causing a housing transport apparatus of a housing to begin transferring a first set of banknotes to and from a transfer cassette and a media aperture interface, the media aperture interface positioned proximate and removably coupled to a media aperture of the transaction device;

causing a transport arm to begin transferring the first set of banknotes to and from the media aperture and the media aperture interface; and determining that the first set of banknotes has been transferred.

19. The media of claim 18, wherein the operations further comprise:

causing a door of the housing to operate from a closed position to an open position;

causing a security skirt of the housing to operate from a first skirt position to a second skirt position when the door is in the open position;

causing the transport arm to extend at least partially outside of the housing when the door is in the open position; and causing the door to operate from the open position to the closed position responsive to determining that the first set of banknotes has been transferred.

20. The media of claim 18, wherein the operations further comprise causing at least one of a housing display or a transaction device display to display a service mode user interface, wherein the service mode user interface is structured to:

display one or more interactive icons structured to receive a user input; and display one or more information icons structured to display operational parameters.

* * * * *